United States Patent
Montouchet

(10) Patent No.: US 12,529,810 B2
(45) Date of Patent: Jan. 20, 2026

(54) MULTIPLE HORIZON EXTRACTION

(71) Applicant: Foster Findlay Associates Limited, Newcastle upon Tyne (GB)

(72) Inventor: Michael Montouchet, Newcastle upon Tyne (GB)

(73) Assignee: Foster Findlay Associates Limited, Newcastle upon Tyne (GB)

( * ) Notice: Subject to any disclaimer, the term of this patent is extended or adjusted under 35 U.S.C. 154(b) by 740 days.

(21) Appl. No.: 17/634,802

(22) PCT Filed: Aug. 13, 2020

(86) PCT No.: PCT/EP2020/072796
§ 371 (c)(1),
(2) Date: Feb. 11, 2022

(87) PCT Pub. No.: WO2021/028547
PCT Pub. Date: Feb. 18, 2021

(65) Prior Publication Data
US 2022/0334280 A1    Oct. 20, 2022

(30) Foreign Application Priority Data

Aug. 14, 2019  (GB) ..................... 1911651

(51) Int. Cl.
G01V 1/30    (2006.01)
G01V 1/34    (2006.01)

(52) U.S. Cl.
CPC .............. *G01V 1/302* (2013.01); *G01V 1/345* (2013.01); *G01V 2210/643* (2013.01)

(58) Field of Classification Search
CPC .. G01V 1/302; G01V 1/345; G01V 2210/643; G01V 20/00; G01V 1/301
See application file for complete search history.

(56) References Cited

U.S. PATENT DOCUMENTS

2004/0260476 A1    12/2004  Borgos et al.
2008/0140319 A1    6/2008  Monsen et al.
(Continued)

OTHER PUBLICATIONS

Hoyes, et al., A review of "global" interpretation methods for automated 3D horizon picking, Jan. 2011, The Leading Edge, vol. 30, issue 1, pp. 38-47 (Year: 2011).*
(Continued)

*Primary Examiner* — Mi'schita' Henson
(74) *Attorney, Agent, or Firm* — Workman Nydegger

(57) ABSTRACT

Computer-implemented methods, apparatus, and computer programs disclosed herein are for obtaining horizon data, and comprise determining at least one extrema binary volume from a seismic data volume comprising a plurality of voxels and assigning a predetermined extrema value to each one of the found extreme voxels; determining an extrema graph from the at least one extrema binary volume; determining a neighbour graph from the extrema graphs; partitioning the nodes of the neighbour graph into a set of clusters, wherein a cluster contains a plurality of connected nodes representing extrema voxels of the at least one extrema binary volume, and each node is part of one cluster only; for each subset of the set of clusters, identifying whether or not the subset is a contradictory set of clusters according to at least one first predetermined condition; hierarchically partitioning the neighbour graph into a plurality of subgraphs, for example using a minimum cut approach, each subgraph being provided by a separate non-contradictory cluster, which is not part of any contradictory sets of clusters; and obtaining horizon data representing a plurality of horizons from the non-contradictory clusters inducing the plurality of subgraphs of the neighbour graph.

20 Claims, 18 Drawing Sheets

(56) References Cited

U.S. PATENT DOCUMENTS

| | | | |
|---|---|---|---|
| 2011/0002194 A1* | 1/2011 | Imhof | G01V 1/32 |
| | | | 367/53 |
| 2011/0048731 A1 | 3/2011 | Imhof et al. | |
| 2013/0064040 A1* | 3/2013 | Imhof | G01V 1/306 |
| | | | 367/73 |
| 2016/0139282 A1* | 5/2016 | Dimitrov | G01V 1/302 |
| | | | 703/2 |

OTHER PUBLICATIONS

Kinming Wu and Guangfa Zhong: "Generating a relative geologic time volume by 3D graph-cut phase unwrapping method with horizon and unconformity constraints", Geophysics, Society of Exploration Geophysicists, US, vol. 77, No. 4, Jul. 1, 2012 (Jul. 1, 2012), pp. O21-O34, XP001576780.

* cited by examiner

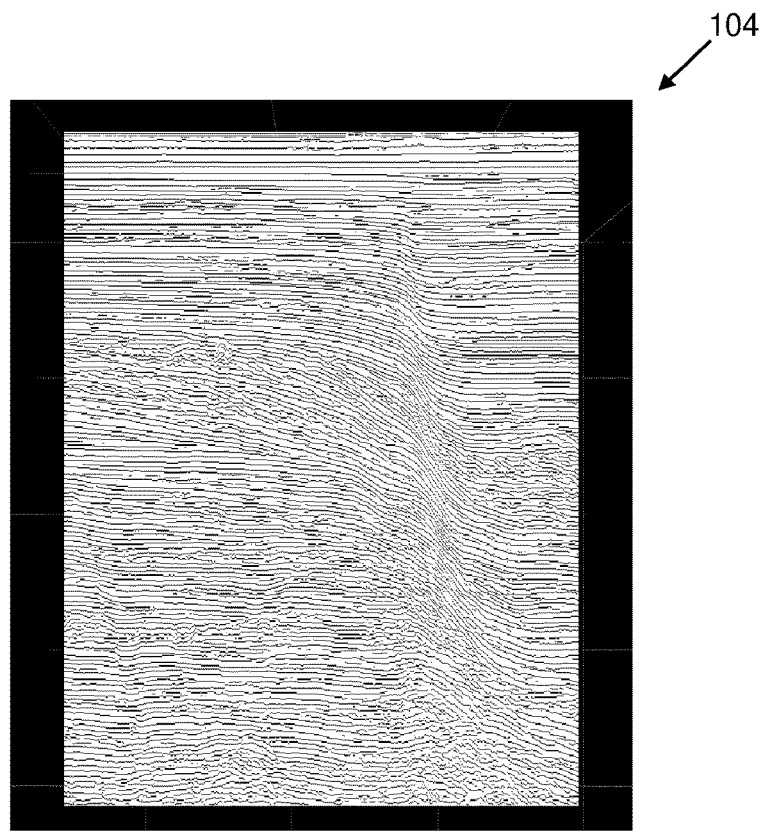
*Figure 1c*
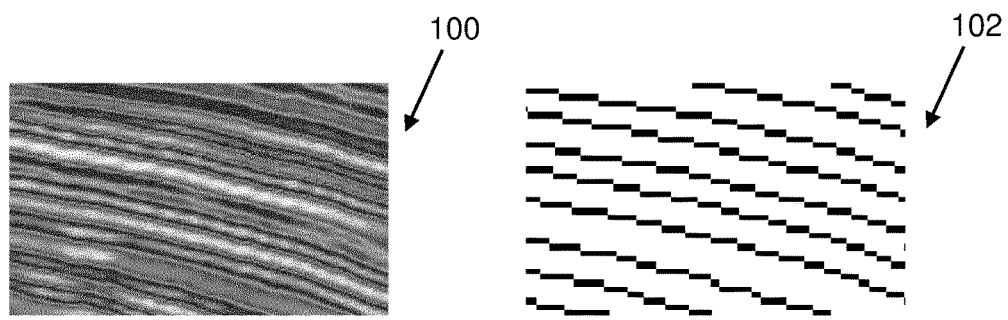
*Figure 2a*  *Figure 2b*
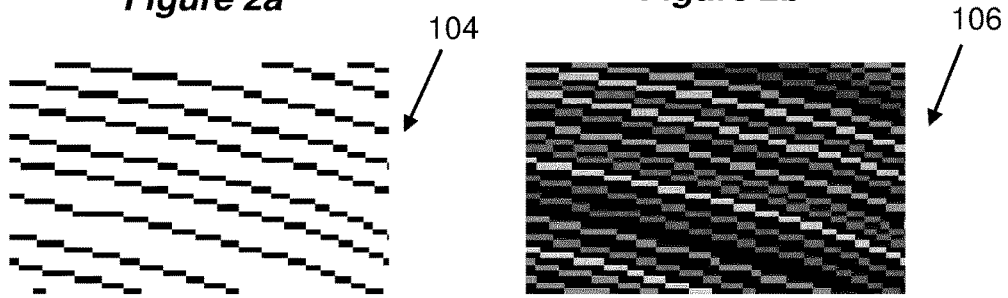
*Figure 2c*  *Figure 2d*

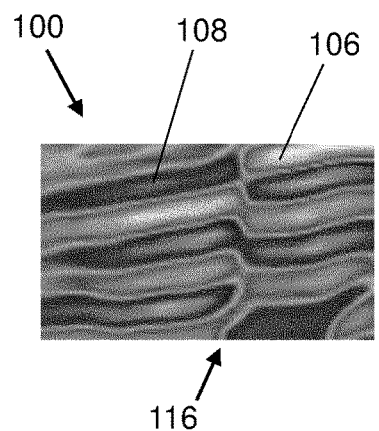
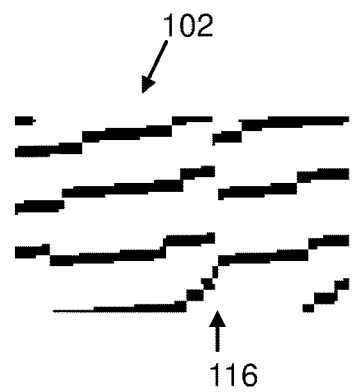
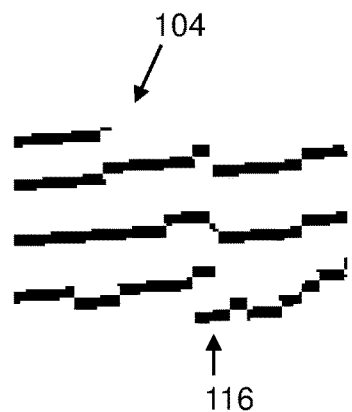
*Figure 5a*     *Figure 5b*     *Figure 5c*
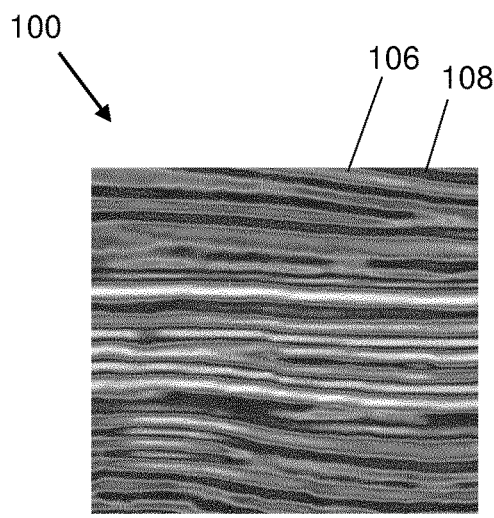
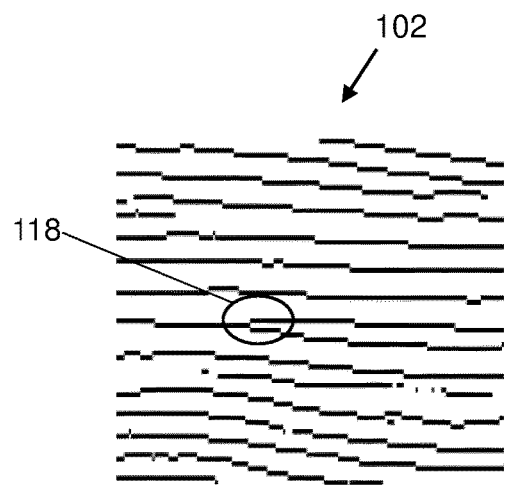
*Figure 6a*     *Figure 6b*
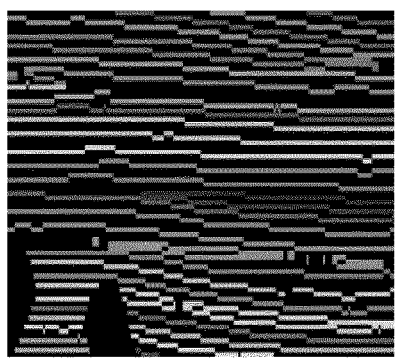
*Figure 6c*

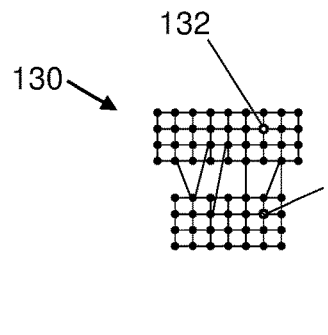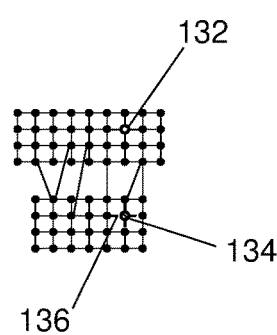
*Figure 11a*          *Figure 11b*
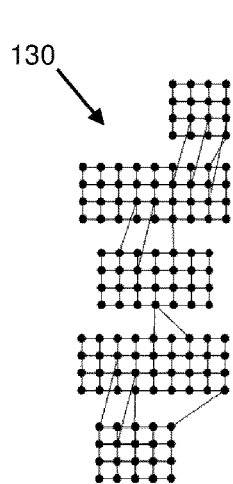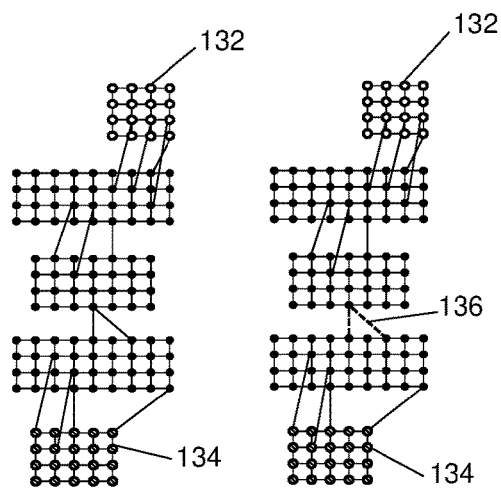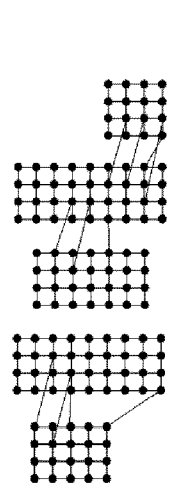
*Figure 11c*
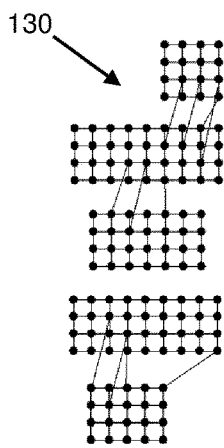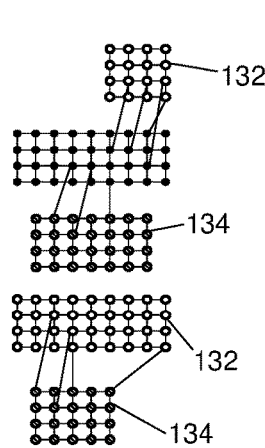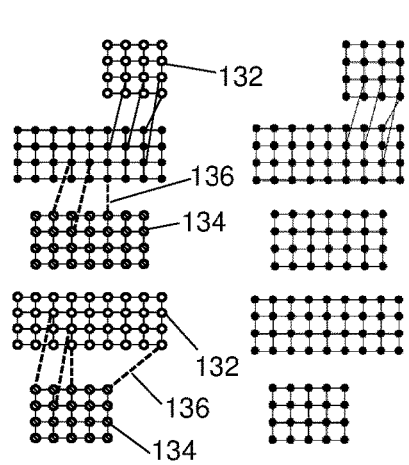
*Figure 11d*

MULTIPLE HORIZON EXTRACTION

CROSS-REFERENCE TO RELATED APPLICATIONS

The present application is a 35 U.S.C. § 371 U.S. National Stage of International Application No. PCT/EP2020/072796, filed on Aug. 13, 2020, which claims priority to Great Britain Patent Application No. 1911651.6, filed Aug. 14, 2019, the entire content of each of which is incorporated herein by reference.

The present invention relates generally to the field of oil and gas exploration, and in particular to the field of computer aided exploration for hydrocarbons using geophysical data, such as for example seismic data, of the earth. Even more particularly, the present invention relates to obtaining horizon data from a seismic volume representing a sampled region of the earth. Aspects relate to a computer implemented method, to an apparatus, and to a computer program.

INTRODUCTION

In the oil and gas industry, geological data surveys such as, for example, seismic prospecting and other similar techniques are commonly used to aid in the search for and evaluation of subterranean hydrocarbon deposits. Prospecting operations include three basic stages (i) data acquisition, (ii) data processing and (iii) data interpretation.

The success of the prospecting operation depends on satisfactory completion of (i), (ii) and (iii). For example, a seismic source is used to generate an acoustic signal that propagates into the earth and that is at least partially reflected by subsurface seismic reflectors. The reflected signals are then detected and recorded by an array of seismic receivers located at or near the surface of the earth, in an overlying body of water, or at known depths of boreholes.

The reflected signals may be computationally assembled into a seismic volume representing the seismic properties of the probed ground. A seismic volume is a three-dimensional (3D) array. Its elements correspond to the value of the seismic signal at some location on a regularly sampled mesh. For visualisation purposes, the seismic volume may be rendered as a regular grid. Each element of the seismic volume corresponds to a voxel in this grid. A seismic trace contains all the voxels of this volume that have the same horizontal coordinates, with different vertical coordinates. As a result, a seismic volume can be understood to be a set of seismic traces.

Seismic reflectivity is a parameter that depends on the mechanical properties of the geological layers. It is zero inside geological layers with homogeneous mechanical properties. Its non-zero values are impulses located at the interfaces between different geological layers. The seismic signal can be understood as a vertical convolution of a wavelet with a series of reflectivities. Therefore, the seismic signal should show peaks or troughs centred on each interface between the different geological layers. However, in most cases, the thickness of the geological layers can be lower than the size of the wavelet. As a result, these peaks and troughs interfere and the apparent local extrema of the peaks and the troughs can be located off the interfaces.

Whenever the mechanical properties are homogeneous inside a set of two adjacent geological layers, the reflectivity is also homogeneous at the interface. Therefore, along the same interface, the seismic signals show a continuous series of peaks (or troughs). On vertical slices through the seismic volume, the interface appears as a series of laterally continuous reflectors, with similar smoothly varying characteristics (such as amplitude and wavelength).

The local extrema (peaks and troughs) have the same properties as the peaks and the troughs and they also appear as laterally continuous surfaces, with their vertical thicknesses being one voxel high. Due to interference, the local extrema of the seismic signal are not always located along the interfaces between the geological layers. But they remain parallel to these interfaces. As such, they are said to be horizons.

Extracting these horizons is vital for basin analysis and geological modelling. They help locating possible hydrocarbon reservoirs and building geological models of these reservoirs. Seismic horizon interpretation of 3D seismic data is a challenging and time consuming problem. 3D auto-tracking (incrementally extracting a horizon from a seed point) can be a very useful and powerful tool for capturing events from largely unambiguous data. Interpreters can spend a vast amount of time building up a cognitive understanding of the data, while at the same time, validating the results from 3D auto-tracked horizons to subsequently edit any errors that are caused by the auto-tracking process.

Most current automatic horizon extraction algorithms start from seed voxels and propagate along the peaks or troughs (or zero-crossings) of the seismic volume according to the similarity of the tracked voxel to the seed. The tracker stops when the similarity is lower than a specified threshold or when it is too far from the seed. Then interpreters have to choose another seed and the process is repeated until they are satisfied with the resulting extracted horizon. This is a highly manual process, and may be described as a semi-automatic process. Tracking can be stopped at fault, salt, channels and unconformity locations, but it requires these geological objects to be interpreted perfectly, which is generally impossible. Most of the interpreters' job consists in choosing seeds on the same horizon as the one initial seed and matching the horizons on both sides of each fault.

One of the challenges is that the faults can connect parts of different horizons. Interpreters may rely on the waveform similarity rather than the continuity of the peak and trough (or zero crossing) reflectors. Interpreters may also check that the extracted horizons are not self-contradictory and do not contradict other horizons. This semi-automatic process can be very slow and interpreters would not try to extract all horizons in a seismic volume. Also, this method does not guarantee that the propagation would end up in joining different paths at the same vertical depth, which would show an interpretation error.

Another approach to automatically extract the horizons includes first clustering the data as a self-organising map, using windowed trace correlations. A seed voxel is first picked. Then, for each trace in the volume, the most similar voxel is chosen based on the similarity of the waveform in the seed's cluster. This method results sometimes in parts of different horizons being merged together, even when separated by faults.

Similarly to the usual horizon tracking methods, another approach is to propagate horizons from seed points but using the local orientation of the dip and azimuth computed from the seismic volume. The propagation is in 3D but the restriction of this method to a 2D horizon extraction is a discretised version of Euler's method. A similar method uses a plane-wave destruction model to estimate the local orientation of the horizons and Dijkstra's algorithm to propagate the horizons from the seeds using the semblance as cost. Dijkstra's algorithm enables changing of the propagation path by focusing on the most probable candidates to be grouped in the tracked horizon.

Another approach is to extract each horizon using the dip and azimuth but using an iterative algorithm, which finds the depth of the horizon along each trace by making sure the horizons are locally orthogonal to the seismic reflectors and relatively continuous. The solution is computed at each iteration by a finite differences approach, based on the estimate of the local orientation of the seismic reflectors. This method is not path dependent, aiding stability and continuity. In addition, interpreters can specify control points, which enables matching of the horizons on both sides of the faults or along an unconformity. The noisy areas, unconformities and faults may confuse the solution, so this method may be performed with a multigrid correlation approach, based on the dynamic time warping algorithm, to fit the horizons better.

However, these dip and azimuth-based methods rely on the quality of the estimated local orientation of the seismic reflectors. Whichever the method used to estimate the dip and azimuth, the estimations take place in a window which includes more data than the local voxel. As a result, the orientation is contaminated by the neighbour orientations of the seismic, so the estimated dip and azimuth are not perfectly accurate. This issue combined with the discretisation can produce horizons not following perfectly the reflectors.

Another proposed approach is to extract all the extrema (local minima, local maxima and zero-crossings) locations of the seismic volume and classify them based on a set of attributes related to the local Taylor expansion of the seismic signal at these extrema locations. This approach produces a lot of horizon patches which then need to be matched up by an interpreter to create full horizons. This method may be performed using many interpreters' inputs, making it also "semi-automatic".

Another approach is based on minimum cost paths, using a dynamic programming algorithm for the two-dimensional version, or on minimum cost surfaces, using the minimum cut algorithm for the three-dimensional version. In both cases, the horizons are extracted by minimising a cost function that measures the similarity between neighbour voxels. This method does not rely on propagation. However, it could still produce discontinuities and leave parts of different horizons merged, especially when it is not constrained enough. As a result, a correct horizon extraction can require a lot of constraints, which makes this algorithm a "semi-automatic" method.

An alternative approach to all these methods consists in computing a geological time volume with a global approach. The horizons are extracted as iso-surfaces of this geological time volume. These methods can require solving a huge system of finite differences equations. The memory limit of current computers (even 32 GB) enables the processing of small subsets of seismic volumes, but not usual sized volumes for the oil and gas industry. Also, noisy areas confuse the solution. Some such methods require a lot of manual adjustments. Some such methods unwrap the phase of the seismic volume. This method can struggle to process unconformities. In addition, phase unwrapping can sometimes miss horizons that are obvious on the initial seismic volume.

Accordingly, it is an object of the present invention to provide a method and system suitable to overcome any of the above mentioned disadvantages. In particular, it is an object of the present invention to provide an improved method for horizon extraction from a seismic data volume.

Horizon extraction methods disclosed herein do not rely on propagation nor inaccurate dips and azimuths. Methods disclosed herein allow for the extracted horizons to not be self-contradictory and to not contradict each other. In order to avoid extracted horizons deviating from the extrema of their polarity (peaks or troughs), the locations of the extrema are first extracted. These locations are used to represent the horizons.

Examples disclosed herein may use a divisive hierarchical clustering process, for example driven by a minimum cut algorithm. The locations of the extrema are organised into connected components and then clustered iteratively, resulting in each cluster representing a single horizon. Data volumes suitable for use by the oil and gas industry may be processed using examples disclosed herein. The resulting parts of horizons obtained require merging when they are completely isolated by faults.

Examples disclosed herein may allow for faster computation of horizon data from a seismic volume by processing the data to remove contradictory clusters in the data, resulting in data which is simpler to process, because it containing fewer contradictions. The data may thereby require less processing power and less memory to handle in a computational horizon extraction method. More accurate horizon data may be obtained because contradictory clusters in the seismic data are systematically addressed and corrected. Increased automation of the extraction of horizon data from seismic data may be achieved compared with previous methods which require a higher level of manual intervention to identify and handle contradictory data than exampled disclosed herein.

SUMMARY OF THE INVENTION

Preferred embodiment(s) of the invention seek to overcome one or more of the above disadvantages of the prior art.

According to a first embodiment of the invention there is provided a computer-implemented method for obtaining horizon data, the method comprising:

determining at least one extrema binary volume from a seismic data volume comprising a plurality of voxels by comparing a value of each voxel of the seismic data volume with values of voxels located above and below the voxel and assigning a predetermined extrema value to each one of a found extrema voxel;

determining an extrema graph from the at least one extrema binary volume, by representing each pair of neighbouring extrema voxels in the at least one extrema binary volume, which are immediately horizontally or immediately diagonally adjacent by two connected nodes in the extrema graph;

determining a neighbour graph from the at least one extrema graph, wherein neighbouring extrema voxels in all of the at least one extrema binary volume are represented as connected nodes in the at least one extrema graph;

partitioning the nodes of the neighbour graph into a set of clusters, wherein a cluster contains a plurality of connected nodes representing extrema voxels of the at least one extrema binary volume, and each node is part of one cluster only;

for each subset of the set of clusters, identifying whether or not the subset is a contradictory set of clusters according to at least one first predetermined condition;

hierarchically partitioning any of the contradictory sets of clusters into a plurality of subgraphs, wherein each subgraph is provided by a separate cluster that is not part of a contradictory set of clusters; and obtaining horizon data representing a plurality of horizons from the non-contradictory clusters inducing the plurality of subgraphs of the neighbour graph.

The at least one first predetermined condition may determine contradictory sets of clusters according to any one or all of:

(i) a set of a single cluster which contains extrema voxels located both vertically above and below one horizontal location;

(ii) a set of two clusters, wherein a first cluster of the set of two clusters is located both above and below a second cluster; or (iii) a set of n clusters, wherein a first cluster of the set of n clusters is located vertically above a second cluster of the set of n clusters; the (n−1)th cluster is located vertically above an nth cluster of the set of n clusters; and the nth cluster is located vertically above the first cluster of the set of n clusters.

Determining the extrema binary volumes may comprise obtaining one or more of:

a peak binary volume, by identifying peak voxels having higher values than the values of the further voxels vertically adjacent to the peak voxels, wherein the peak voxels are assigned a value of '1' and remaining voxels are assigned a value of '0';

a trough binary volume, by identifying trough voxels having lower values than the values of the further voxels vertically adjacent to the trough voxels, wherein the trough voxels are assigned a value of '1' and remaining voxels are assigned a value of '0';

a positive to negative zero-crossing binary volume, by identifying voxels with positive values immediately above voxels with negative values and, for each set of two voxels in which a voxel with a positive value is immediately above a voxel with a negative value, retaining the voxel with the value closer to zero, wherein the positive to negative zero-crossing voxels are assigned a value of '1' and remaining voxels are assigned a value of '0';

a negative to positive zero-crossing binary volume by identifying voxels with negative values immediately above voxels with positive values and, for each set of two voxels in which a voxel with a negative value is immediately above a voxel with a positive value, retaining the voxel with the value closer to zero, wherein the negative to positive zero-crossing voxels are assigned a value of '1' and remaining voxels are assigned a value of '0', and obtaining the at least one extrema graph, using the extrema voxels having a value of '1' from at least one of the peak binary volume, the trough binary volume, the positive to negative zero-crossing binary volume and the negative to positive zero-crossing binary volume.

Determining the extrema graph from the at least one extrema binary volume may comprise connecting neighbouring voxels of the extrema binary volume having a value of one which are immediately horizontally or immediately diagonally adjacent, each connected voxel forming a node in the neighbour graph.

Determining the neighbour graph from the at least one extrema graph may comprise concatenating two or more extrema graphs obtained from: the peak binary volume, the trough binary volume, the positive to negative zero-crossing binary volume and the negative to positive zero-crossing binary volume.

A clusters volume may be obtained by assigning each cluster with a unique index and setting the value of the voxels representing the nodes contained by each cluster as the matched index for that cluster in the clusters volume. The background of the clusters volume (i.e. voxels that are not in the clusters) may be set to any value different from the values of the indices of the clusters (e.g. '0'). The horizon data may be represented by a clusters volume, but in other examples the horizon data may be represented differently.

The method may further comprise representing the clusters in an oriented graph, by:

representing each cluster of nodes in the neighbour graph by a node in the oriented graph; and representing a first cluster located immediately above a second cluster by an oriented edge in the oriented graph, the oriented edge connecting a first node representing the first cluster and a second node representing the second cluster;

wherein the oriented graph indicates the relative vertical positions of the clusters in the clusters volume representing the set of clusters, and also indicates the presence of a contradictory set of clusters as being represented by a cycle in the oriented graph.

A contradictory set of two clusters may be identified from a cycle containing exactly two nodes in the oriented graph.

A contradictory set of n clusters may be identified from a cycle containing exactly n nodes in the oriented graph.

Identifying whether or not a set of two clusters is contradictory may comprise determining that a cluster is below a further cluster by:

starting at an extrema voxel represented by a node of the cluster in the neighbour graph;

scanning vertically downwards from the starting node;

stopping at each encountered extrema voxel represented by a node of a first cluster in a cluster volume representing a set of clusters, the further cluster being immediately below the first cluster.

Identifying whether or not a set of two clusters is contradictory may comprise determining that the cluster is above a further cluster by:

starting at an extrema voxel represented by a node of the cluster in the neighbour graph;

scanning vertically upwards from the starting node; and stopping at each encountered extrema voxel represented by a node of a first cluster in a cluster volume representing a set of clusters, the further cluster being immediately above the first cluster.

Identifying whether or not a set of clusters containing one single cluster is contradictory may comprise determining that the cluster contains at least two extrema voxels at the same horizontal location/coordinates.

Solving the contradictory sets of clusters may be performed by:

first, solving contradictory sets of clusters containing one cluster; then solving contradictory sets of two clusters; then solving contradictory sets of n cluster, where n>2.

If the contradictory set of clusters contains a single cluster, the method may further comprise partitioning the subgraph of the neighbour graph induced by the nodes of the single cluster using a minimum cut algorithm to partition the single cluster into a first new cluster and a second new cluster.

If the contradictory set of clusters contains exactly two clusters, the method may further comprise partitioning the subgraph of the neighbour graph induced by the nodes of one of the two clusters using a minimum cut algorithm to partition the cluster into a first new cluster and a second new cluster.

Using the minimum cut algorithm to partition one of a plurality of clusters may comprise identifying one of a plurality of possible cuts having the smallest cost, wherein the cost comprises the sum of weights of the cut edges in the subgraph induced by the cluster.

Using the minimum cut algorithm to partition one of a plurality of clusters may comprise computing the minimum cut between source nodes and sink nodes, wherein the minimum cut generates two new clusters, in which one new cluster contains the source nodes and possibly other nodes, and in which the other new cluster contains the sink nodes and possibly other nodes.

A cut of a graph may be defined as the set of edges such that, when the edges are removed, the graph is partitioned into two disconnected subgraphs. A minimum cut of a graph may be defined as a cut (i.e. a partition of the nodes of a graph into two disjoint subsets of nodes) that is minimal in some sense. A minimum cut disconnecting a set of source nodes from a set of sink nodes may be considered to be a cut that minimises the number of edges in the cut such that the source nodes are contained by the first subgraph and the sink nodes are contained by the second subgraph.

The neighbour graph may be represented as an oriented graph by duplicating each non-oriented edge of the neighbour graph to form two oriented edges having opposite orientations.

The weight of any edge may be optionally computed as the normalised correlation of windowed vertical seismic data centred at the voxels represented by the end nodes of the edge. Otherwise, it may be set to one. In the first case, the cost of a cut is the sum of the weights of the edges it contains. In the second case, the cost of a cut is the number of edges it contains.

If the set of clusters contains exactly one single cluster, solving the contradictory set of clusters may comprise:
  defining one or more candidate source nodes contained by the cluster and representing extrema voxels located above other extrema voxels represented by nodes contained by the same cluster;
  defining one or more candidate sink nodes contained by the cluster and representing extrema voxels located below other extrema voxels represented by nodes contained by the same cluster;
  retaining the candidate source nodes, as source nodes, which form the largest connected component of the subgraph of the neighbour graph induced by the candidate source nodes, and
  retaining the candidate sink nodes, as sink nodes, which form the largest connected component of the subgraph of the neighbour graph induced by the candidate sink nodes.

If the set of clusters contains exactly two clusters, solving the contradictory set of clusters may comprise:
  defining one or more candidate source nodes representing extrema voxels contained by a first cluster of the two clusters and located above other extrema voxels represented by nodes contained by a second cluster of the two clusters;
  defining one or more candidate sink nodes representing extrema voxels contained by the first cluster and located below other extrema voxels represented by nodes contained by the second cluster;
  retaining the candidate source nodes, as source nodes, which form the largest connected component of the subgraph of the neighbour graph induced by the candidate source nodes;
  retaining the candidate sink nodes, as sink nodes, which form the largest connected component of the subgraph of the neighbour graph induced by the candidate sink nodes;
  using a minimum cut algorithm disconnecting the source nodes from the sink nodes to partition the subgraph of the neighbour graph induced by the first cluster into two new subgraphs and partitioning the first cluster into two new clusters inducing the two new subgraphs;
  defining one or more candidate source nodes representing extrema voxels contained by the second cluster and located above other extrema voxels represented by nodes contained by the first cluster;
  defining one or more candidate sink nodes representing extrema voxels contained by the second cluster and located below other extrema voxels represented by nodes contained by the first cluster;
  retaining the candidate source nodes, as source nodes, which form the largest connected component of the subgraph of the neighbour graph induced by the candidate source nodes;
  retaining the candidate sink nodes, as sink nodes, which form the largest connected component of the subgraph of the neighbour graph induced by the candidate sink nodes;
  using a minimum cut algorithm disconnecting the source nodes from the sink nodes to partition the subgraph of the neighbour graph induced by the second cluster into two new subgraphs and partitioning the second cluster into two new clusters inducing the two new subgraphs; and
  retaining one of the two partitions of the first and the second clusters which minimises the cost of the cut used to obtain the partition.

Identifying which one of two clusters is partitioned and which one remains unchanged may comprise:
  computing the cost of the cut disconnecting the two subgraphs of the neighbour graph induced by the two clusters, the cost being the sum of the number of edges of the neighbour graph contained in the cut; and
  partitioning the cluster which results in the lowest cost cut, and retaining the cluster which results in the highest cost cut.

If the set of clusters contains exactly n clusters, wherein n>2, solving the contradictory set of clusters may comprise:
  representing the neighbour graph as an oriented graph according to a previous aspect of the invention (see page 8, l.1ff), wherein the contradictory set of n clusters is represented in the oriented graph as a cycle, the nodes in the cycle representing the set of n clusters; and
  identifying at least one elementary cycle in the oriented graph and removing the nodes representing the smallest clusters contained by the elementary cycle and retaining the node representing the largest cluster contained by the elementary cycle.

Obtaining the horizon data, when solving for contradictory sets of n clusters wherein n>2, may comprise:
  in the retained cluster represented by the retained oriented graph node, removing all nodes from the neighbour graph which represent extrema voxels located vertically above and below extrema voxels represented by nodes contained in clusters represented by the nodes removed from the oriented graph; and removing the clusters represented by the removed oriented graph nodes from the set of clusters and removing all the nodes in these clusters from the neighbour graph.

Voxels represented by nodes removed from the neighbour graph may not appear in the final horizon data.

A smallest cluster may be considered to comprise the smallest number of voxels compared with the other clusters in the set of n clusters. A largest cluster may be considered to comprise the largest number of voxels compared with the other clusters in the set of n clusters.

Identifying the elementary cycle in the oriented graph may comprise identifying at least one set of nested cycles in the oriented graph; the method further comprising reducing the at least one set of nested cycles to at least one elementary cycle by:

setting a score initialised to the same predetermined value for each oriented edge joining nodes in the nested cycles;

incrementing each oriented edge score by one for each cycle that contains that oriented edge;

retaining the oriented edge having the highest score of all the oriented edges in each cycle of the set of nested cycles; and identifying the shortest cycle containing this edge as the elementary cycle.

The seismic data volume may be processed to reduce noise in the seismic volume data prior to the determining of the extrema binary volumes from the processed seismic data volume.

The neighbour graph may be processed to remove one or more clusters containing fewer than a predetermined number of nodes prior to, for each remaining cluster, identifying whether the cluster is part of a contradictory set of clusters.

Edges of the neighbour graph connecting a node with two nodes representing voxels having the same horizontal coordinates may be removed from the neighbour graph prior to identifying whether there are any contradictory sets of clusters.

A binary fault volume may be computed by voxelising a plurality of fault surfaces. The extrema binary volumes may be set to zero where the binary fault volume is equal to one. The binary fault volume may be computed as a binary threshold indicator version of a fault prediction or fault attribute volume, the threshold being predetermined. The binary fault volumes produced by a plurality of different methods may be merged. A binary fault mask may be applied and may be dilated.

The extrema binary volumes may be set to zero where the binary chaos volume is equals to one. The binary chaos volume may be computed as a binary threshold indicator version of chaos attribute volume, the threshold being predetermined. If a salt binary volume is provided, the extrema binary volumes may be set to zero where the salt binary volume is equals to one.

Alternatively or additionally, the method may comprise that, if the seismic data volume exceeds a predetermined size threshold, the seismic data volume may first be divided into adjacent blocks of seismic data before commencing the steps of determining at least one extrema binary volume, determining an extrema graph from each extrema binary volume, determining a neighbour graph from the extrema graph and partitioning the nodes of the neighbour graph into a set of clusters for each one of the adjacent blocks of seismic data. Preferably, the set of clusters extracted from the adjacent blocks of seismic data may be connected, so as to form a set of clusters within the full seismic data volume.

According to a further embodiment of the invention there is provided an apparatus comprising a processor and memory, wherein the processor is configured to perform any method disclosed herein.

According to a further embodiment of the invention there may be provided a computing device comprising an apparatus as disclosed herein configured to perform any method disclosed herein.

Any apparatus described herein may suitably comprise a control unit or computational device having one or more electronic processors. The term "apparatus" should be understood to include both a single processor and a plurality of processors collectively operating to provide any stated functionality. To configure a processor, a suitable set of instructions may be provided which, when executed, cause said apparatus or computational device to implement the techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

According to a further embodiment of the invention there is provided a computer-readable storage medium having embodied thereon a computer program, when executed by a computer processor, is configured to perform any method disclosed herein.

It will be appreciated that examples disclosed herein may be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present disclosure. Accordingly, examples disclosed herein may provide a program comprising code for implementing any method as disclosed herein and a machine readable storage storing such a program. Still further, examples disclosed herein may be conveyed electronically via any medium such as a communication signal carried over a wired or wireless connection and examples suitably encompass the same.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Preferred embodiments of the present invention will now be described, by way of example only and not in any limitative sense, with reference to the accompanying drawings, in which:

FIGS. 1a-1c show an initial seismic volume, a peak mask volume and a trough mask according to examples disclosed herein;

FIGS. 2a-2d show an initial seismic volume, a peak mask volume, a trough mask volume and a horizon volume according to examples disclosed herein;

FIGS. 5a-5c illustrate an initial seismic volume, a peak binary volume and a trough binary volume discontinued by a fault according to examples disclosed herein;

FIGS. 6a-6c show a seismic volume, peak binary volume and a series of horizons according to examples disclosed herein;

FIGS. 11a-11e show partitioning of a cluster in a neighbour graph, including hierarchical divisive clustering of the neighbour graph, according to examples disclosed herein;

FIGS. 20a-b show (a) the two sets of nodes separated by the minimum cut (see description) from the reduced bin of FIG. 19b, and (b) two new bins obtained from partitioning the bin illustrated in FIG. 19a using the partition of the reduced bin illustrated in FIG. 20a;

DETAILED DESCRIPTION

Examples disclosed herein provide methods and apparatus which can be used to obtaining horizon data from seismic volume data. In particular, examples disclosed herein allow for seismic data to be analysed to determine if any contradictory horizons are present (i.e. horizons which are not geologically possible) and process the data to remove contradictory sets of clusters of voxels forming part of a horizon. Certain examples provide for this processing to be performed in a computationally efficient way, to reduce processing time and processor power requirements compared with method which do not handle contradictory clusters in this way and obtain meaningful geological horizon data from captured seismic data.

A goal of methods disclosed herein is extracting horizons by partitioning extrema voxels from a seismic volume (i.e. voxels assigned with value of 'one' or '1' in an extrema binary volume) into a set of clusters, so that each cluster of nodes represents a part of one single horizon (or ideally one single full horizon). Extrema voxels may be assigned with any extrema value (such as, for example, the value '1' or '0') in order to delineate a geological feature within the seismic data volume. Also, throughout the detailed description, the terms 'voxels' and "extrema voxels" are used interchangeably, generally referring to the voxels containing an extrema value, e.g. from a peak, trough or a zero-crossing (either way) of the seismic trace. Methods disclosed herein may be used to extract disconnected parts of horizons in a seismic volume as clusters while disconnecting parts of different horizons one from another by solving three types of contradictory sets of clusters. Methods disclosed herein may perform nested clustering (divisive hierarchical clustering) from the initial set of clusters, such that each final cluster contains a part of one horizon only (at least a part of one single horizon, but ideally a single full horizon).

1. Method(s) for a Single Seismic Data Volume

Figure 1A:
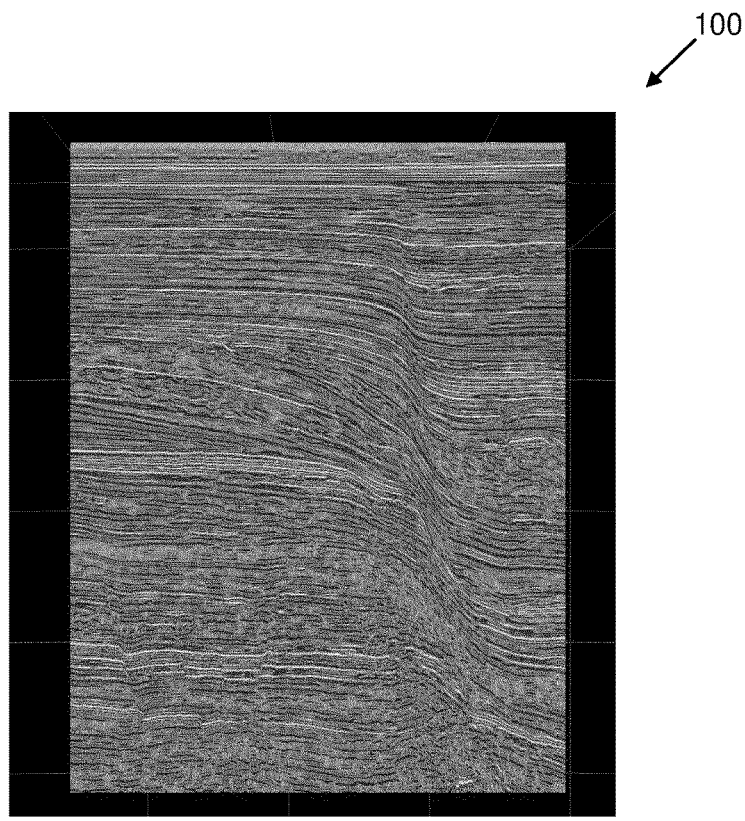
Figure 1B:
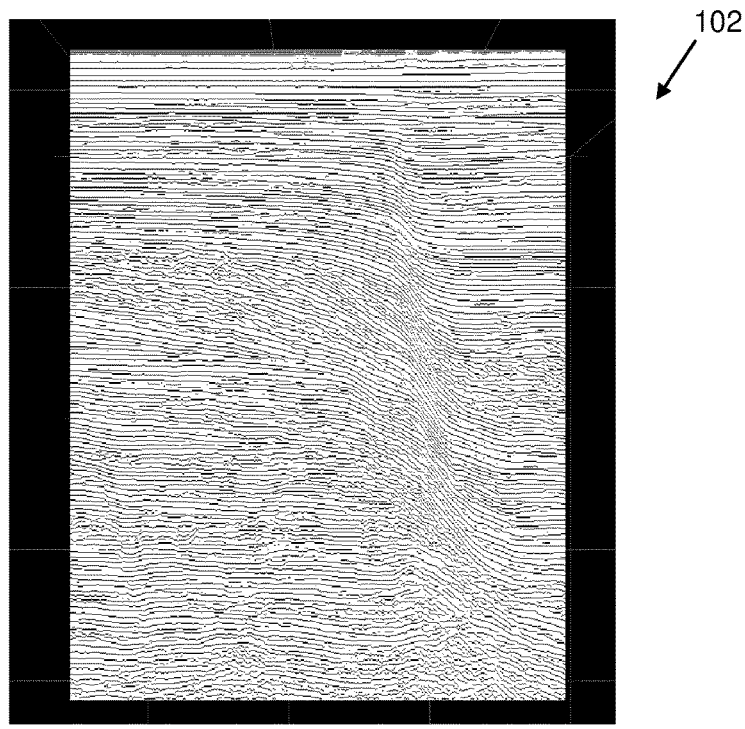

FIG. 1a shows an initial seismic volume 100, FIG. 1b shows a peak mask volume 102 obtained from the seismic volume and FIG. 1c shows a trough mask volume 104 obtained from the seismic volume. The seismic data comprises a plurality of voxels. One step in determining horizons from a seismic volume comprises determining the local extrema (in this example as extrema binary values in which the voxels have a value of either 1 or 0) from the seismic data. Locations of the local vertical extrema may be found by comparing the value of each voxel in the seismic volume 100 with the values of its immediate vertical neighbours (above and below) from the seismic volume. FIG. 1b shows a peak binary volume 102, with a voxel value of one for the vertical maxima voxels and zero for the other voxels. FIG. 1c shows a trough binary volume 104, with a voxel value of one for the vertical minima voxels and zero for the other voxels. A mask volume may also be called an extrema volume or a binary volume. In examples disclosed herein, it is assumed that an apparent local dip of a horizon in both inline and crossline slices through the seismic volume is always lower or equal to 45°.

FIG. 2a shows an initial seismic volume 100, FIG. 2b shows a peak mask volume 102 obtained from the seismic volume, FIG. 2c shows a trough mask volume 104 obtained from the seismic volume, and FIG. 2d shows a horizon volume 106 obtained from the peak and trough mask volumes combined. Determining the extrema in the seismic volume 100 may comprise determining peaks in the seismic data volume 100 from a plurality of neighbouring voxels having maximum values compared with the values of the vertically neighbouring voxels. This would result in a peak binary volume 102. Determining the extrema in the seismic volume 100 may comprise and determining troughs in the seismic data volume from a plurality of neighbouring voxels having minimum values compared with the values of the vertically neighbouring voxels. This would result in a trough binary volume 104. In a seismic volume with no faults, no noise, no unconformities, no salt, and continuous reflectors, each connected component of the peak mask and the trough mask corresponds to a unique horizon (see FIG. 2d). Each extrema voxel may be represented by a node at its centre. Two connected nodes in the neighbour graph represent two neighbour voxels in one of the at least one extrema binary volumes. Horizon extraction is straightforward in such a case where there are no ambiguities or contradictions in the data and each connected component would represent a unique horizon.

However, in real data cases, it is not simple to extract horizons as in the example of FIGS. 2a-2d. Faults, noise, and other real world effects represented in the data give rise to uncertainties in where horizons lie, and horizons can be in apparent contradiction. Horizons are surfaces tangent to geological layers arranged in the earth, with older layers located below newer layers. Thus, if a seismic volume contains apparent contradictory sets of clusters (portions of different horizons being incorrectly connected), these contradictions have to be addressed and removed from the data to obtain a non-contradictory seismic volume containing horizons. A contradiction arises where a cluster is both above and below a voxel in the clusters volume, or where a cluster is both above and below at least one other cluster, or where a first cluster is above a second cluster, and so on, until the (n−1)th cluster is above an nth cluster and the nth cluster is above the first cluster. These situations cannot arise geologically and may be referred to as being geologically unfeasible. Examples disclosed herein address the problem of contradictory sets of clusters in a seismic volume by identifying contradictory sets of clusters and partitioning at least one of these clusters into two (or more) non-contradictory clusters.

Another step in determining horizons from a seismic volume comprises determining an extrema graph from each extrema binary volume. This may be done by connecting neighbouring voxels in each extrema binary volume, which are immediately horizontally or immediately diagonally adjacent, and have a value equals to one, by two connected nodes, as shown in FIG. 3, with each connected voxel being represented as a node in the extrema graph 113, as shown in FIG. 4 (discussed below).

Figure 3:
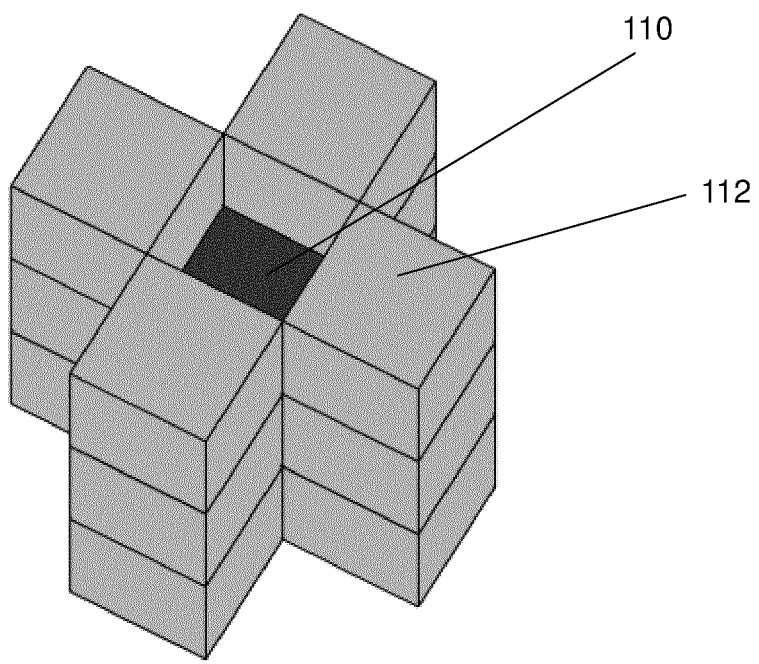
FIG. 3 shows the neighbourhood of a voxel according to examples disclosed herein.
Figure 4:
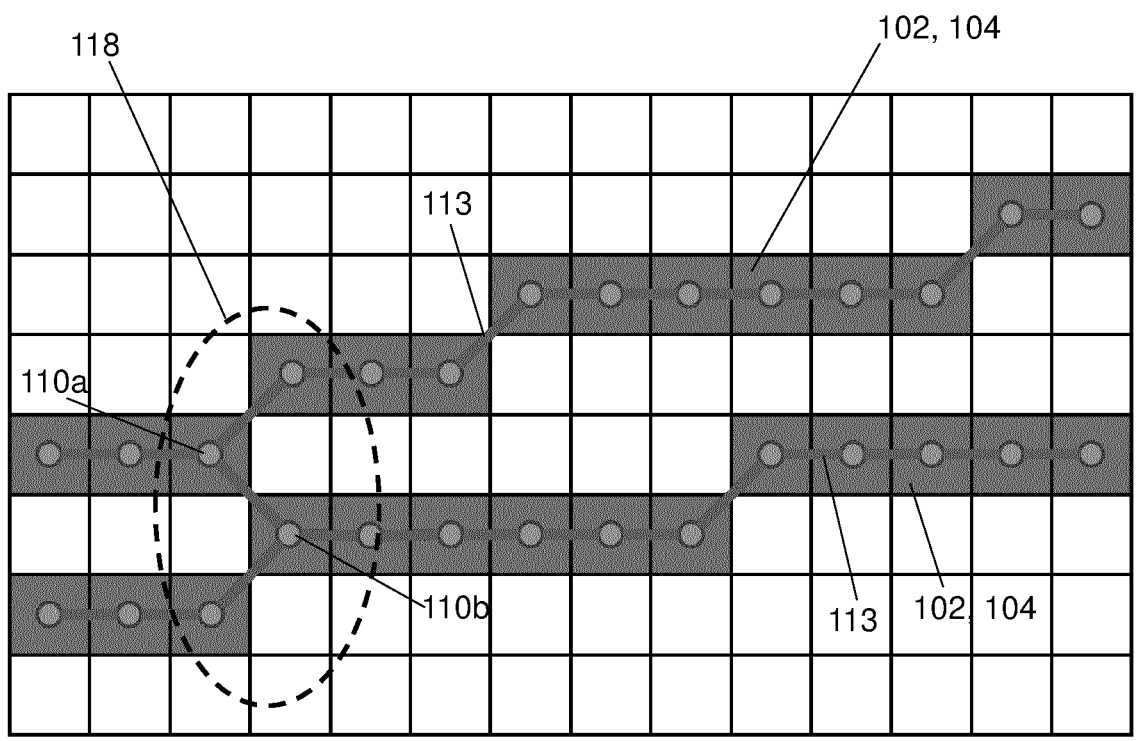
FIG. 4 shows a portion of an extrema graph overlaying an extrema binary volume according to examples disclosed herein.

FIG. 3 shows the neighbourhood of a voxel 110 in a seismic volume. A neighbouring voxel 112 in this example is a voxel which is adjacent horizontally or immediately diagonally from the voxel 110. A definition of a neighbouring voxel 112 may be expressed thus: Let A and B be two voxels. Their coordinates in the seismic volume are (iA, jA, kA) and (iB, jB, kB). The coordinates of vector AB are (iAB, jAB, kAB), with iAB=iB−iA, jAB=jB−jA and kAB=kB−kA. The voxels A and B are neighbours if and only if |iAB|+|jAB|=1 and |kAB|<=1. The set of neighbours of a voxel may be called a neighbourhood.

The extrema binary volume 102, 104 can be represented as an extrema graph 113. Determining the extrema graph 113 from the extrema binary volume 102, 104 may comprise connecting neighbouring voxels having value '1' from the extrema binary volume 102, 104, which are immediately horizontally or immediately diagonally adjacent.

Each node in the extrema graph 113 represents a voxel with value '1' in the extrema binary volume 102, 104. Edges may connect two nodes representing two neighbour voxels in the extrema binary volume 102, 104.

FIG. 4 shows an extrema graph 113 (for example, peaks, troughs, or zero crossings, but only one of these) overlaying an extrema binary volume 102, 104. The neighbour graph 114 may, in some examples, be used with all edge weights being equal to one. In this case, the cost of a cut is the number of edges it contains. The neighbour graph 114 may, in some examples, be used with different edge weights. A relevant weight for an edge that links nodes A and B may be the normalised correlation of the windowed vertical seismic traces centred at the locations of the voxels corresponding to nodes A and B (i.e. the end nodes of the edge). In both cases, the cost of a cut is the sum of the weights of the edges it contains. A trace is a column of seismic data, including one voxel horizontally and all voxels vertically, from the top to the base of the seismic volume. A "windowed" vertical seismic trace is a part of a trace, for example, it could be five adjacent voxels, or more, or less. "Centred at the location of the voxel A" means voxel A is at the centre of the voxels included in the windowed trace (vertically).

The cluster formed by including all the nodes in example extrema graph of FIG. 4 is self-contradictory because it contains several nodes representing voxels with the same horizontal coordinates. Such a cluster cannot represent a single horizon as it would be geologically inconsistent. Solving this self-contradiction may result in cutting the edge that connects nodes 110a and 110b.

Other contradictions can arise in neighbour graphs obtained from seismic volume data. FIGS. 5a-5c illustrate seismic reflectors 108 and 106 and the corresponding extrema discontinued by a fault 116. One of the effects of the faults is disconnecting horizons into different parts and laterally connecting parts of different horizons (see 5a-5c). In the peak and trough volumes 102, 104, it appears that horizons either side of the fault 116 are connected, whereas geologically the left and right sides of what appears as a single continuous horizon are parts of different horizons having different geological ages.

In addition to faults, noise in the seismic volume can add local extrema at random locations, which acts to decrease the continuity of the reflectors, and can also connect different horizons.

Unconformities connect a single horizon with many other horizons. They may arise, for example, as a result of erosion and/or special sedimentation cases. For the needs of the oil and gas industry, these different horizons need to be disconnected. FIG. 6a-c show a seismic volume 100 (FIG. 6a), the corresponding peak binary volume 102 (FIG. 6b) and a series of horizons 106 (FIG. 6c) in which an unconformity 118 provides a peak voxel having two neighbours with the same horizontal coordinates (i.e. it appears that a single horizon at the left of the volume splits into two horizons at the right of the volume.

Figure 7A:
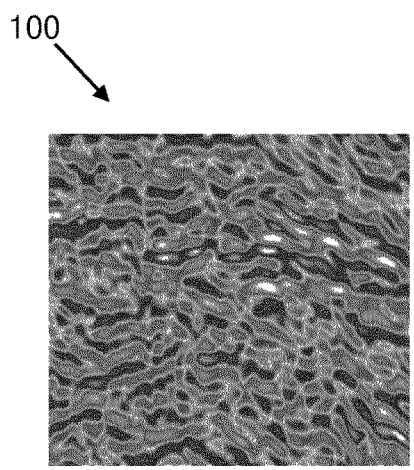
FIGS. 7a-7c show a seismic volume, a peak mask volume and a trough mask in a noisy area according to examples disclosed herein.
Figure 7B:
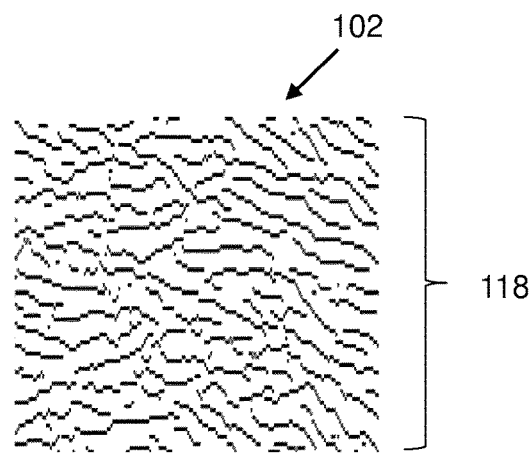
Figure 7C:
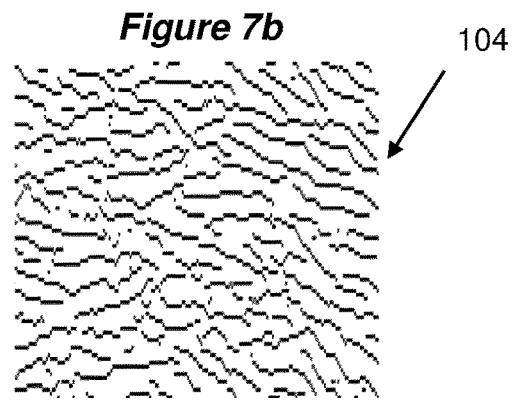

Further, salt regions in the sampled volume produce a coherent noisy signal in the seismic volume 100, whose extrema can be connected to the horizons giving a false impression of horizons being longer than they actually are. This is shown in FIG. 7a-c showing extrema discontinuities in a salt zone, in which FIG. 7a is a seismic volume 100, FIG. 7b is a peak binary volume 102, and FIG. 7c is a trough binary volume 104 corresponding to the seismic volume 100.

Several processes can help attenuate the effect of faults, noise, salt and unconformities in the seismic volumes. Setting zero values for the peak mask 102 and the trough mask 104 at fault locations can help to disconnect different parts of horizons into several connected components. In addition, noise removal or attenuation may be performed on the seismic volume prior to computing the extrema binary volumes.

Doing so may also help disconnect different incorrectly connected parts of horizons from each other. In some examples, the neighbour graph 114 obtained from the extrema binary volume(s) 102, 104 may be processed to remove any cluster containing fewer than a predetermined number of nodes prior to, for each remaining cluster, identifying whether the cluster is part of a set of contradictory clusters. Voxels represented by nodes removed from the neighbour graph 114 may not appear in the final horizon data.

Figure 8A:
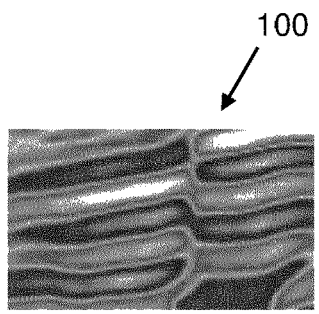
FIGS. 8a-8e show an initial seismic volume, and a peak mask volume and trough mask both with and without fault voxels according to examples disclosed herein.
Figure 8B:
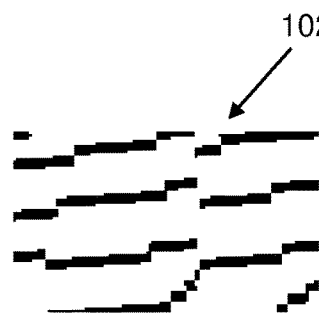
Figure 8C:
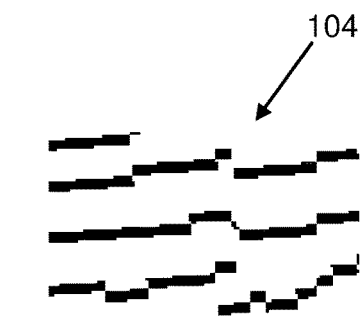
Figure 8D:
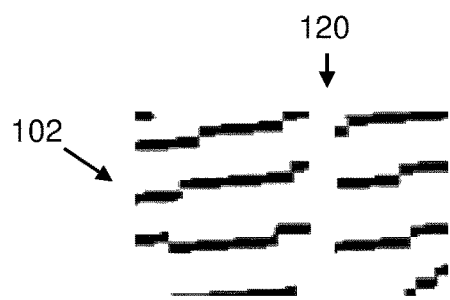
Figure 8E:
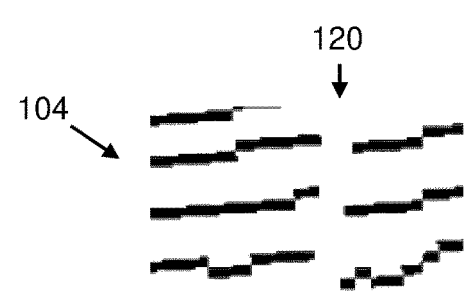

FIG. 8a-8e illustrate removing voxels in a fault region. FIG. 8a is a seismic volume 100, FIG. 8b is a peak binary volume 102 and FIG. 8c is a trough binary volume 104 computed from the seismic volume 100. FIGS. 8d and 8e are respectively peak and trough volumes 102, 104 in which incorrectly connected components are addressed at a fault 120 by setting zero the value of the peak and trough binary volumes at the fault. A connected component may be defined as: a subgraph of a graph is a connected component if and only if, for any pair of two distinct nodes in the subgraph, there exists a path between both nodes and there are no edges connecting a node of the subgraph to a node that is not in the subgraph. As a result of a fault, a connected component of an extrema graph could gather several parts of different horizons and even include some locations that are not horizons. This would imply that all the connected components do not correspond to a single horizon.

A subgraph may be defined as follows: a subgraph S of a graph G is another graph formed from a subset of the nodes and edges of G. The subset of nodes must include all endpoints of the subset of edges, but may also include additional nodes. For an induced subgraph, if G is a graph and S is a subset of nodes of G, then the subgraph induced in G by S is the graph whose set of nodes is S and whose set of edges is all the edges of G that have both endpoints in S.

If faults are interpreted and provided as surfaces, they may be voxelised to produce a fault mask. A fault mask may be computed from the fault surfaces by setting the value of its voxels that are intersected by the faults to one, and the value of the other voxels is set to zero. Otherwise, the binary fault volume may be computed as a binary threshold indicator version of a fault prediction or fault attribute volume, the threshold being predetermined. The binary fault volumes produced by a plurality of different methods may be merged.

In order to avoid wrong connections between different horizons due to the damaged zone along the faults, the fault mask may be dilated. Dilation is a mathematical operation aimed at expanding a shape (i.e. the voxels with value '1' in a binary volume).

The extrema binary volumes may be set to zero where the binary fault volume is equal to one.

In salt domes, there are no horizons. As a result, the extrema binary volumes may be set to zero value in such areas to avoid extracting non-existing horizons.

Very noisy areas may not enable horizon interpretation, even from experts. Such noisy areas may be captured by a chaos attribute. A binary chaos volume may be computed as a binary threshold indicator version of chaos attribute volume, the threshold being predetermined. The extrema binary volumes may be set to zero where the binary chaos volume is equals to one.

Also, edges connecting a node and two other nodes with the same horizontal coordinates in the neighbour graph may be removed from the neighbour graph to help disconnecting horizons that are connected by unconformities.

Figure 9A:
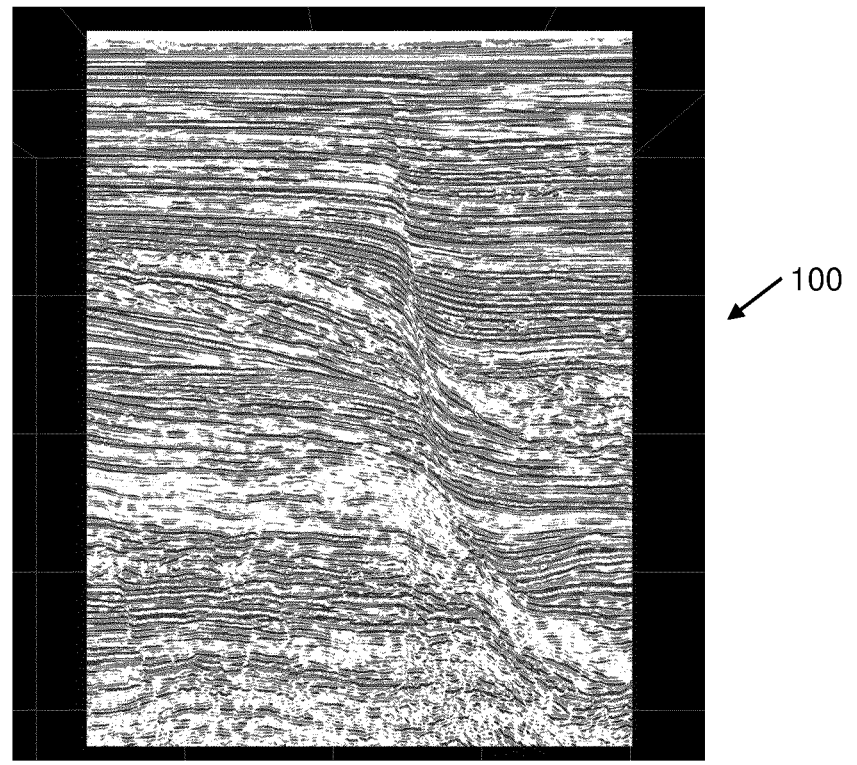
FIGS. 9a-9b show a seismic volume and horizon volume containing contradictory clusters according to examples disclosed herein.
Figure 9B:
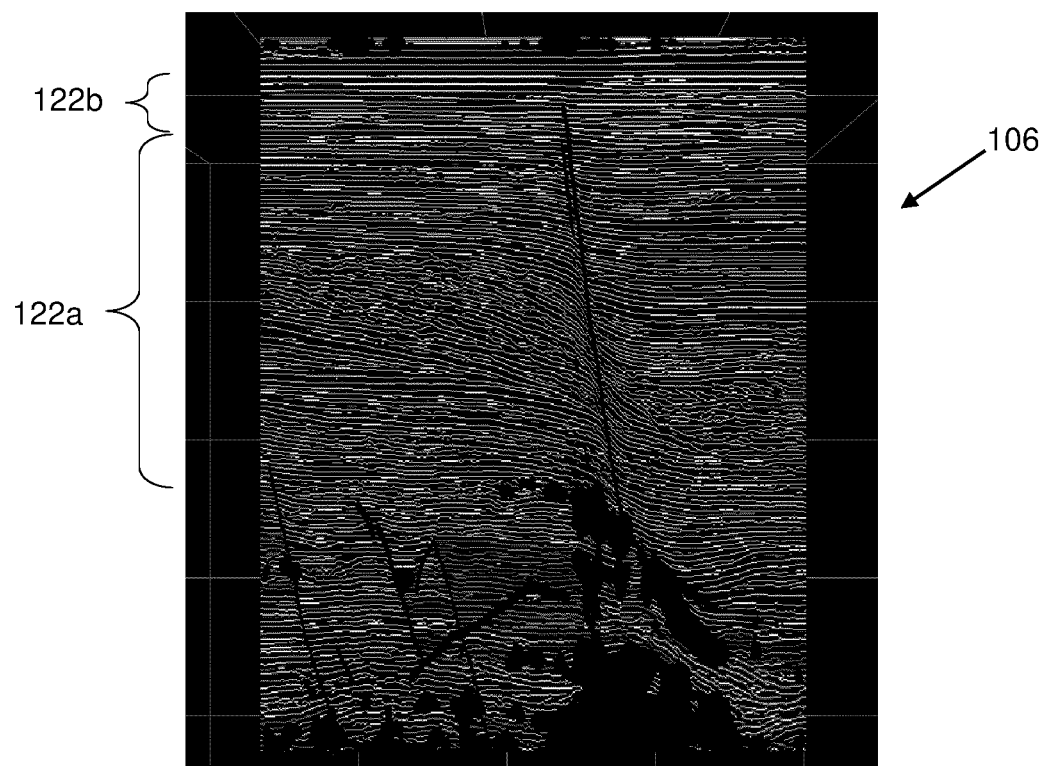

The above-mentioned processes, combined with a good quality fault interpretation, noise removal and salt interpretation, may reduce the number of incorrect connections between parts of different horizons. However, achieving perfect fault and salt interpretation, noise removal and unconformity disconnection in this way is unfeasible. Even though such methods reduce the occurrences of incorrectly connected horizons, not all connections between different horizons can be removed. A real-world example of this is shown in FIG. 9a-9b in which a seismic volume 100 is treated as discussed above to remove fault and noise regions, but each cluster computed as a connected component of the resulting neighbour graph may contain more than one single horizon.

To prevent these horizon connection issues from happening in the processed seismic data, the connected components of the neighbour graph representing the seismic volume should be disconnected another way. Methods disclosed herein allow for disconnection of incorrectly connected horizons arising from faults, unconformities, salt, noise and other imperfections in the seismic volume data, and allow for more correct horizon data to be obtained from the seismic volume in an automated and consistent way.

Figure 10:
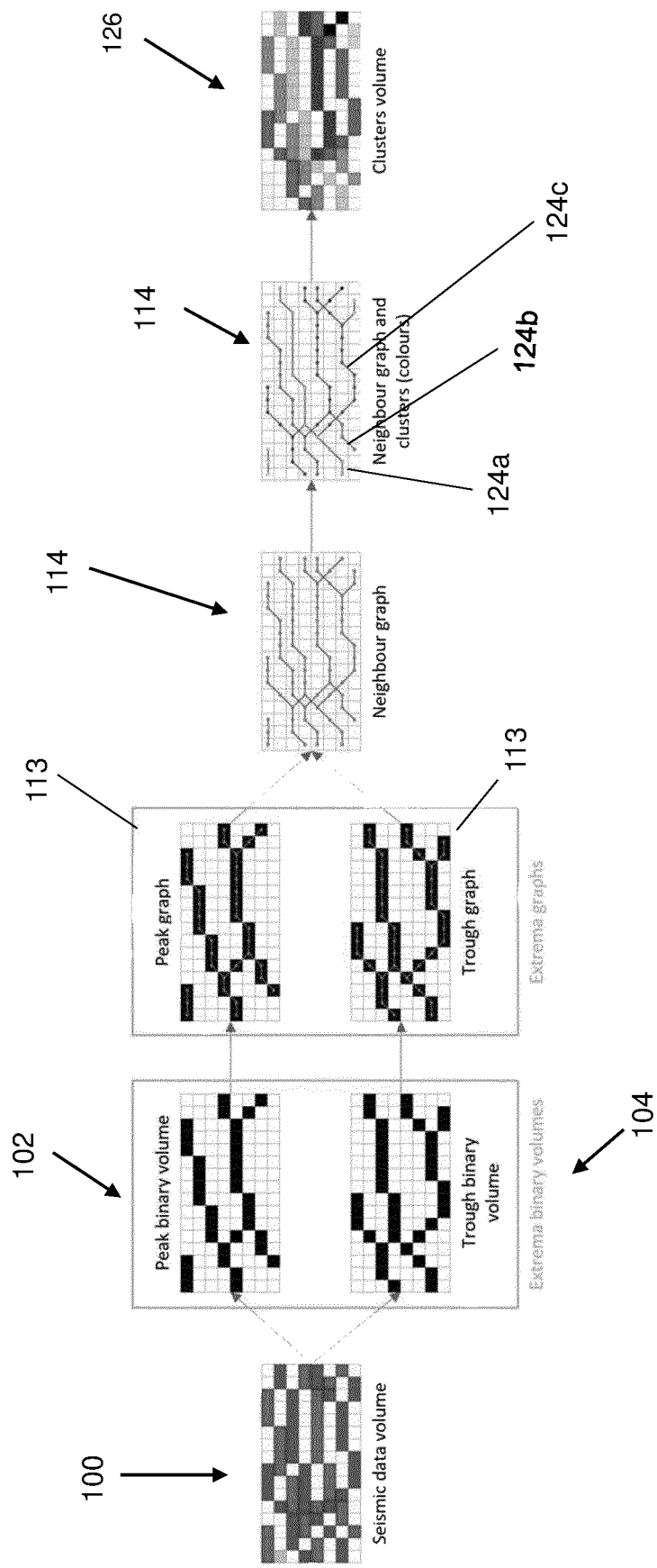
FIG. 10 shows an example method for processing seismic data according to examples disclosed herein.

FIG. 10 illustrates a method for processing seismic data 100 to obtain a volume of non-contradictory clusters representing (geologically) consistent horizon data. A seismic data volume 100 may be processed to obtain one or more extrema binary volumes. In this example a peak binary volume 102 and a trough binary volume 104 are extracted from the seismic volume 100. That is, at least one extrema binary volume 102, 104 is determined from a seismic data volume 100. The at least one extrema binary volume 102, 104 is determined by comparing the value of each voxel of the seismic data volume 100 with the value of the adjacent voxels located above and below (for example, immediately above and below without intervening voxels).

Determining an extrema volume 102, 104 may comprise obtaining one or more of the following representation of extrema in the seismic volume. A peak binary volume 102 may be obtained by identifying peak voxels having higher values than the values of the further voxels vertically adjacent to the peak voxels, wherein the peak voxels are assigned a value of '1' and remaining voxels are assigned a value of '0'. A trough binary volume 104 may be obtained by identifying trough voxels having lower values than the values of the further voxels vertically adjacent to the trough voxels, wherein the trough voxels are assigned a value of '1' and remaining voxels are assigned a value of '0'. A positive to negative zero-crossing binary volume may be obtained by identifying voxels with positive values immediately above voxels with negative values and, for each set of two voxels in which a voxel with a positive value is immediately above a voxel with a negative value, retaining the voxel with the value closer to zero. A negative to positive zero-crossing binary volume may be obtained by identifying voxels with negative values immediately above voxels with positive values and, for each set of two voxels in which a voxel with a negative value is immediately above a voxel with a positive value, retaining the voxel with the value closer to zero.

In general, determining the neighbour graph 114 from the extrema graphs 113 may comprise concatenating two or more extrema graphs 113 obtained from the peak binary volume 102, the trough binary volume 104, a positive to negative zero-crossing binary volume and a negative to positive zero-crossing binary volume. The neighbour graph 114 may represent one or more types of extrema binary volumes, such as peak 102 and trough 104 binary volumes.

The sum of all the extrema binary volumes used to compute the extrema graph that are concatenated as the neighbour graph may be zero or one, i.e. the value of each voxel is one in only one of the binary volumes and zero in the others, so that each voxel corresponds to only one node in the neighbour graph. A method to achieve this comprises setting the zero crossing binary volumes to zeros where the peak and trough binary volumes are equals to one (only if the peaks and troughs are included in the neighbour graph), and setting the positive to negative zero crossing binary volume to zero where the negative to positive zero crossing binary volume is equals to one (the inverse is another possibility).

From each of the extrema binary volumes 102, 104, a respective extrema graph 113 may be determined by connecting neighbouring voxels with values equal to one in each extrema binary volume which are immediately horizontally or immediately diagonally adjacent, wherein each connected voxel is represented as a node in the extrema graph 113. Obtaining the extrema graph may be performed using the voxels having a value of '1' from one or more of the peak binary volume, the trough binary volume, the positive to negative zero-crossing binary volume and the negative to positive zero-crossing binary volume.

The extrema graphs 113 (if more than one is obtained from the seismic data volume, as in this example) may be concatenated into a neighbour graph 114. Then, the nodes of the neighbour graph 114 may be partitioned into a set of clusters 124a, 124b, 124c. This may be achieved by partitioning the nodes of the neighbour graph 114 into a set of clusters 124a, 124b, 124c, wherein a cluster 124a, 124b, 124c contains a plurality of connected nodes from the neighbour graph 114 representing voxels in the binary volumes 102, 104, and each voxel is part of one cluster only. In some examples, edges connecting a node with two other nodes having the same horizontal coordinates may be removed from the neighbour graph 114 prior to identifying whether the cluster is contradictory.

From the clusters, a clusters volume 126 having non-contradictory clusters of voxels can be computed. Obtaining the clusters volume may be achieved by assigning each cluster with a unique index, and setting the value of the voxels contained by each cluster as the index for that cluster. The background of the clusters volume (i.e. voxels that are not in the clusters) may be set to any value different from the values of the indices of the clusters (e.g. '0'). In this way, each cluster is identifiable from the clusters volume through use of the index assigned to it. That is, the clusters in the clusters volume 126 are non-contradictory (i.e. they represent horizons which are geologically allowed/feasible). This may be achieved by, for each subset of the set of all clusters, identifying whether the subset is a contradictory set of clusters. There are several possible situations in which a set of clusters is contradictory, and therefore contains voxels representing parts of different horizons.

Cluster A is said to be located above cluster B if it contains a voxel located vertically above a voxel contained by cluster B. Cluster A is said to be located below cluster B if it contains a voxel located vertically below a voxel contained by cluster B.

A contradictory set of clusters may be defined as:
(1) a set of a single cluster which is located above and below itself. Such a cluster may be said to be self-contradictory.
(2) a set of two clusters, wherein the first cluster is located both above and below the second cluster. Such a pair of clusters may be said to be contradictory.
(3) a set of n clusters, wherein the first cluster is located above the second cluster, the second cluster is located above the second cluster, and so on, until the (n−1)th cluster is located above the nth cluster; and the nth cluster is located above the first cluster. Such a set of clusters may be called a cycle. A pair of two contradictory clusters is a special case of a cycle, but may be solved in a specific way.

Clusters of voxels may be represented in an oriented graph, by representing each cluster of nodes in the neighbour graph by a node in the oriented graph. A first cluster may be represented as being located immediately below a second cluster by an oriented edge in the oriented graph, the oriented edge connecting a first node representing the first cluster and a second node representing the second cluster. The oriented graph therefore indicates the relative vertical positions of the clusters in the seismic data volume, and indicates the presence of a set of contradictory clusters as being represented by the nodes of a cycle in the oriented graph.

If a contradictory set of clusters is identified, the contradiction may be removed by cutting the neighbour graph 114 into a plurality of subgraphs, wherein each subgraph enables generating a new separate non-contradictory cluster which is not part of a contradictory set of clusters, the subgraph being induced by the new cluster.

Partitioning the cluster may also be termed "splitting" or "separating" the cluster into separate clusters represented by separate subgraphs. These different terms may be used to mean that a cluster of connected nodes representing voxels representing one or more horizons can be partitioned into new non-contradictory clusters (that is, the respective nodes representing the voxels can be partitioned to form at least two new separate clusters of connected nodes, each new cluster representing a part of one single horizons).

A cut of a graph may be defined as a set of edges such that, when the edges are removed, the graph is partitioned into two disconnected subgraphs. A minimum cut of a graph may be defined as a cut that is minimal in some sense. A minimum cut disconnecting a set of source nodes from a set of sink nodes is a cut that minimises the number of edges in the cut such that the source nodes are contained by the first subgraph and the sink nodes are contained by the second subgraph.

From the obtained set of non-contradictory clusters, horizon data 126 representing a plurality of horizons from the plurality of subgraphs 124a, 124b, 124c may be obtained.

1.1 Solving Self-Contradictory Clusters

In some examples, if the contradictory set of clusters contains a single cluster, the subgraph of the neighbour graph induced by the nodes of the single cluster may be cut, for example using a minimum cut algorithm, to partition the single cluster into a first new cluster and a second new cluster.

A self-contradictory cluster may be defined as intersecting at least one trace at different vertical locations along the trace. The intersection between the trace and the cluster therefore occurs at, at least two voxels of the cluster. A self-contradiction indicates that the cluster contains at least two parts of different horizons, in which the first part contains the top voxel and the second part contains the base voxel. Examples disclosed herein may identify whether a set of clusters containing one single cluster is contradictory by determining that the cluster contains at least two voxels at the same horizontal coordinates (i.e. and at different vertical locations). A minimum cut algorithm may be used to partition these two parts, belonging to separate horizons, and remove the contradiction.

Several algorithms are aimed at solving the maximum flow problem, which has been shown to be equivalent to the minimum cut problem. This algorithm is referred to herein as the minimum cut algorithm. A minimum cut disconnecting source nodes from sink nodes partitions a graph into two subgraphs. As a result, it partitions the cluster formed by the nodes of the graph into two clusters that induce the two subgraphs. One of them contains the source nodes and the other contains the sink nodes. A cut that disconnects source nodes from sink nodes is a set of edges such that, when removed from the initial graph, the source nodes and the sink nodes are disconnected. The minimum cut is the cut that minimises the cut cost (sum of the weights of the cut edges). Sometimes, there exist several different minimum cuts.

The minimum cut algorithms accept oriented graphs only, but the edges connecting the nodes in the neighbour graph are not oriented. In order to use a minimum cut algorithm with the neighbour graph which is not an oriented graph, two oriented edges with opposite orientations may replace each non-oriented edge. The result is an oriented version of the neighbour graph.

Removing the cut edges from the neighbour graph generates two connected components, which can be seen as two separated subgraphs of the initial neighbour graph.

The minimum cut algorithm tends to create small clusters. When there is one voxel with few edges for the source or the sink, then the minimum cut algorithm may isolate this node in the first cluster and the other nodes in the second cluster, by removing all its edges. This is shown in FIG. 11a in which a source node 132 and sink node 134 are shown in a neighbour graph 130. Minimum cut edges 136 isolate one node 134 from all the other nodes in the neighbour graph 130, but does not partition the graph 130 as expected into two clusters representing portions of horizons.

To prevent this issue from happening, the group of source nodes 132 and the group of sink nodes 134 should contain as many nodes as possible. This is shown in FIG. 11b in contrast to FIG. 11a. Here, the minimum cut edges 136 isolate the two horizon portions as expected.

If, prior to identifying contradictory clusters, removing the voxels close to the faults and salt and removing unconformity related edges has taken place, the connection between parts of two different horizons is assumed to be sparse, which is what is shown in FIGS. 11c and 11d. Therefore, the minimum cut algorithm is expected to be able to disconnect the different horizons and leave them in different clusters.

The nodes contained by the neighbour graph 130 (FIG. 11c) represent voxels from different horizons. In FIG. 11c, there are four different possible cuts in the initial graph that would generate two new subgraphs induced by two new clusters, each one representing at least one horizon. Choosing the source nodes very close to the sink nodes would not enable so many cuts to be found as minimum cuts disconnecting the sink from the source. As stated above, the minimum cut is expected to result in disconnecting the voxels representing the different horizons but this is not always performed perfectly. However, it can be assumed that, the lower the cost of the cut, the lower the imperfection. Because the hierarchical clustering is an iterative process, the clusters from the previous iterations may be used as starting points for the following iterations. An error made at the first iteration is likely to propagate and influence the quality of the following iterations. In order to minimise the propagation of errors, the cut with minimum cost should be found at the first iteration of the hierarchical clustering. To enable all cuts, including the cut with minimum cost, to be found as the minimum cut disconnecting the source from the sink, the source and sink nodes should be as distant/far apart as possible. A good choice is therefore nodes representing top voxels (vertically highest) to be candidate source nodes 132, and nodes representing base voxels (vertically lowest) to be candidate sink nodes 134. Starting from the top of the seismic volume, the first node for each trace can be set as a candidate source node 132. Similarly, starting from the base of the seismic volume, the first node for each trace can be set as a candidate sink node 134. The only traces considered to identify the candidate source and sink nodes are the traces that contain at least two voxels in the cluster.

To avoid a cut that would result in creating more than two clusters, the source nodes should be connected and the sink nodes should be connected. To this end, the largest (biggest) connected component of the candidate source nodes may be set as the source node 132. Similarly, the largest connected component of the candidate sink nodes may be set as the sink node 134. If some nodes could be both source and sink, then the source node 132 may be changed for a node in the second largest connected component of candidate source nodes or the sink node 134 may be changed for a node in the second largest connected component of candidate sink nodes. The choice depends on which of these components is the largest. This change prevents the source nodes 132 from intersecting the sink nodes 134.

In other words, if the set of (contradictory) clusters contains exactly one single cluster, partitioning the cluster may comprise: defining one or more candidate source nodes contained by the cluster and located above other nodes contained by the same cluster; defining one or more candidate sink nodes contained by the cluster and located below other nodes contained by the same cluster; retaining the candidate source nodes, as source nodes, which form the largest connected component of the neighbour graph generated by the candidate source nodes; and retaining the candidate sink nodes, as sink nodes, which form the largest connected component of the neighbour graph generated by the candidate sink nodes.

Figure 11E:
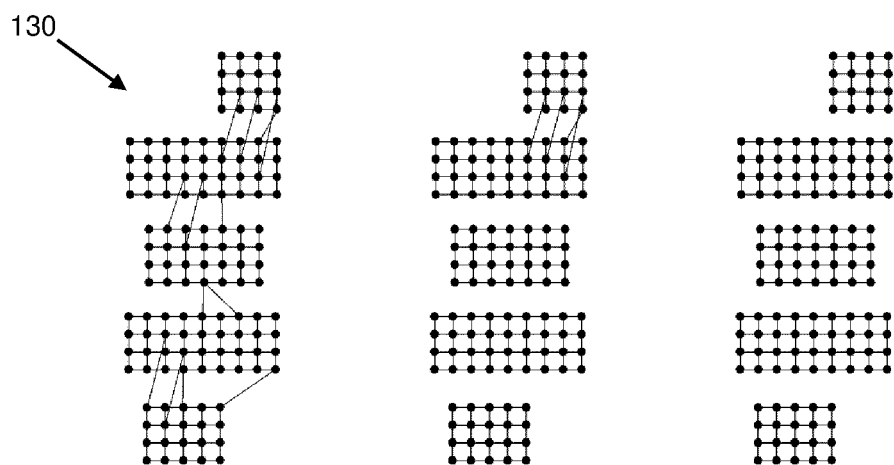

This clustering process may be repeated on the resulting subgraphs to create even more subgraphs, so that the clusters inducing the subgraphs form a partition of the nodes of the neighbour graph, until there are no more self-contradictory clusters (see FIGS. 11c 11d and 11e). In FIG. 11b, several horizons are connected by a few sparse edges. The source nodes 132 are set to be the top of the cluster, the sink nodes 134 are set to be the base of the cluster. The minimum cut 136 is removed from the graph. This kind of iterative clustering algorithm is an example of divisive hierarchical clustering. FIG. 11e shows hierarchical divisive clustering of the neighbour graph. The links between the horizons are progressively removed. In the end, each cluster contains a part of one horizon.

Figure 12A:
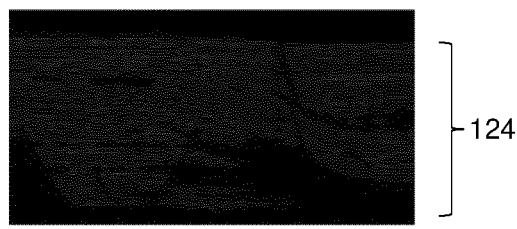
FIGS. 12a-12h show different stages of the hierarchical clustering, starting from an initial cluster, which gets partitioned incrementally.
Figure 12B:
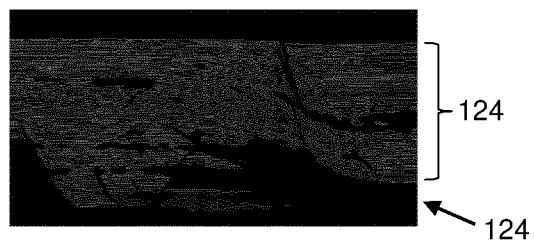
Figure 12C:
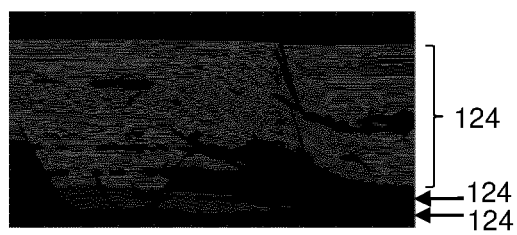
Figure 12D:
Figure 12E:
Figure 12F:
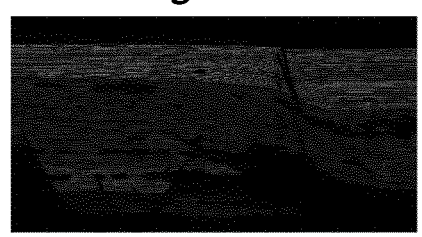
Figure 12G:
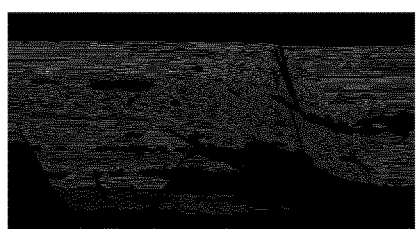
Figure 12H:
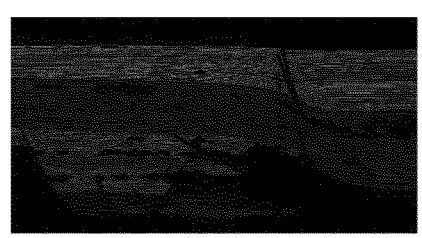

FIGS. 12a-12h show clusters volumes computed from the clusters obtained after zero to seven iterations of this divisive hierarchical clustering. The initial cluster (FIG. 12a) gets partitioned into two new clusters (FIG. 12b) and so on until eight new clusters are obtained (FIG. 12h).

In the event of a fault not being spotted during the interpretation stage, the edges created by the fault in the neighbour graph between parts of different horizons can be identified by the minimum cut algorithm. Improved accuracy in the resulting horizons may be achieved by combining fault interpretation and removal in combination with the partitioning process to remove contradictory sets of clusters. Further, improved processing speed of seismic data may be achieved by first treating the seismic data volume to remove/simplify fault data regions prior to partitioning any clusters, since the number of inaccurate cluster connections arising due to the fault data are reduced prior to running the partitioning algorithm.

1.2 Solving Contradictory Pairs of Clusters

In a contradictory pair of clusters, the first cluster is above and the second cluster is below in some traces but the first cluster is below and the second cluster is above in other traces. The contradictory pairs of clusters may be found, and then solved by partitioning one of the clusters.

To find all the contradictory pairs of clusters, it is possible to check all pairs of clusters one by one. However, to increase the computational speed, the process of identifying contradictory pairs of clusters is reduced to finding pairs of clusters located both below and above each other.

In other words, identifying whether a set of two clusters is contradictory may comprise determining that the cluster is immediately below a further cluster, by starting at a node of the cluster in the neighbour graph, scanning vertically downwards from the starting node, and stopping at the first encountered node of a further cluster the seismic data volume, wherein the further cluster is immediately below the cluster. In some examples, identifying whether a set of two clusters is contradictory may comprise determining that the cluster is immediately above a further cluster, by starting at a node of the cluster in the neighbour graph, scanning vertically upwards from the starting node, and stopping at an encountered node of a further cluster in the neighbour graph, the further cluster being immediately above the cluster.

If the clusters in each pair of contradictory clusters corresponded to geological horizons, this situation would be impossible as horizons can only be located such that one horizon is above the other horizon, but one cluster representing a single horizon cannot be located simultaneously above and below the other cluster representing a second horizon. Contradictory pairs of clusters show that one of the two clusters (at least) contains parts of different horizons. The minimum cut algorithm may again be used to partition them.

Figure 13:
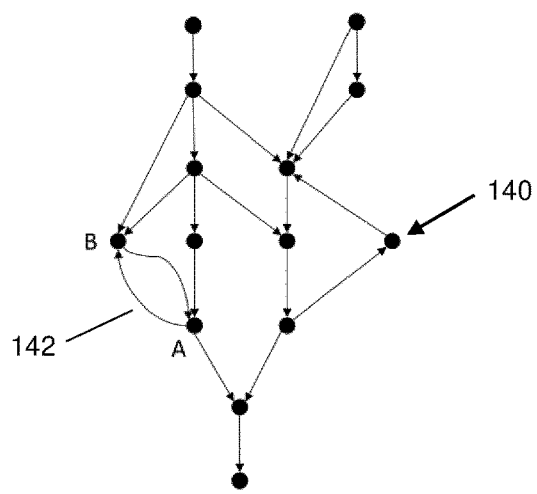
FIG. 13 shows an oriented graph containing a two-node cycle according to examples disclosed herein.

Let us consider that each cluster is now represented by a node, as shown in FIG. 13, each cluster being located immediately below another cluster creates an oriented edge connecting the two nodes representing the two clusters. These nodes and oriented edges define an oriented graph, which may be called a vertical relative location graph. A cycle is a set of edges starting and ending at the same node. Any cycle containing exactly two nodes corresponds to a contradictory pair of clusters. FIG. 13 shows an oriented graph 140 containing a two-node cycle 142 containing nodes A and B only. Identifying which one of two clusters is partitioned and which one remains unchanged may comprise: computing the cost of cutting each one of the two subgraphs of the neighbour graph induced by the two clusters, the cost being the sum of the number of edges of the neighbour graph contained in the cut; and partitioning the cluster which results in the lowest cost cut, and retaining the cluster which results in the highest cost cut.

If the set of clusters comprises a first cluster and a second cluster, partitioning one of the two clusters may comprise: defining one or more candidate source nodes as nodes contained by the first cluster and located above any nodes contained by the second cluster; defining one or more candidate sink nodes as nodes contained by the first cluster and located below any nodes contained by the second cluster; retaining the candidate source nodes, as source nodes, which form the largest connected component of the subgraph of the neighbour graph induced by the candidate source nodes; and retaining the candidate sink nodes, as sink nodes, which form the largest connected component of the subgraph of the neighbour graph induced by the candidate sink nodes.

One or more contradictory pairs of clusters may be hidden by an intermediate cluster, resulting in no cycle representing it in the oriented graph. To prevent them from not being detected, any oriented edge that has not already been detected as corresponding to a contradictory pair of clusters may be checked. If one of them corresponds to a contradictory pair of clusters then it may be added to the list of contradictory pairs of clusters to be addressed.

Figure 14A:
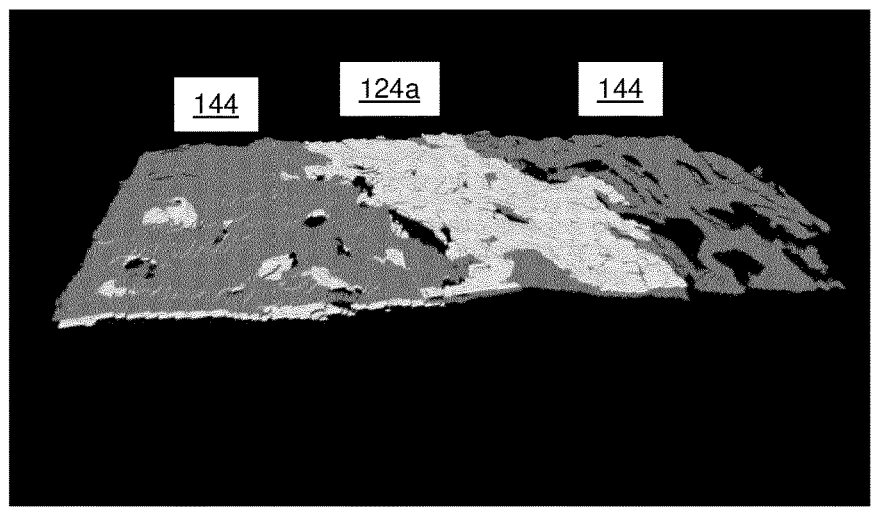
FIGS. 14a-14b show a contradictory cluster both above and below another cluster according to examples disclosed herein and the effect of partitioning one of the two clusters.
Figure 14B:
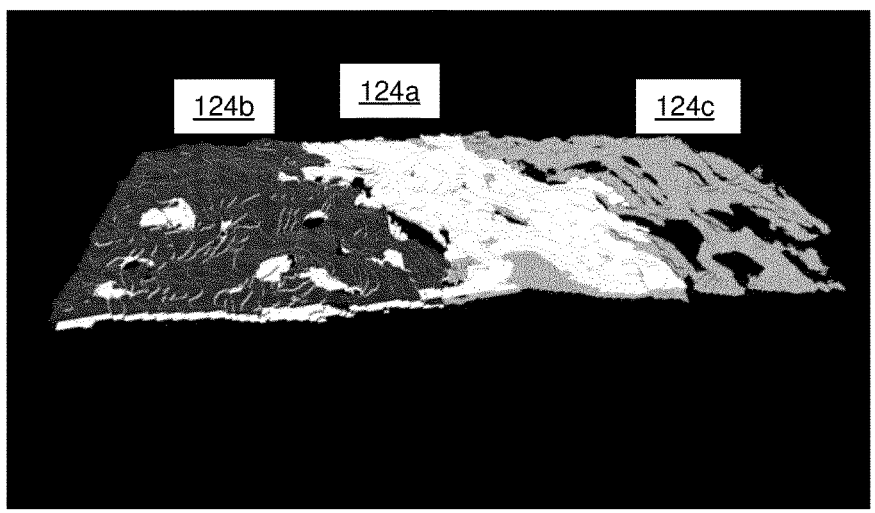

Then a minimum cut may be computed disconnecting these source nodes from these sink nodes. Among two cuts on the two subgraphs induced by the two clusters, the one with minimum cost may be used to obtain two new clusters. This is shown in FIGS. 14a and 14b. In FIG. 14a, the contradictory cluster 144 lies both above and below the cluster 124a. In FIG. 14b, the contradictory cluster has been partitioned so that two separate clusters lie such that one new cluster 124b is above the cluster 124a and the other new cluster 124c is below the cluster 124a.

Partitioning a cluster in a pair of contradictory clusters to remove the contradiction may comprise defining a plurality of vertical traces through the two clusters 124a, 144 in the seismic data volume 100; defining a first set of the plurality of traces as traces in which a first 124a of the two clusters is above a second 144 of the two clusters, and defining a second set of the plurality of traces as traces in which the second 144 of the two clusters is above the first 124a of the two clusters; for each of the first 124a and second 144 clusters, identifying the largest group of connected voxels intersecting the first set of traces as candidate source nodes, and identifying the largest group of connected voxels intersecting the second set of traces as candidate sink nodes; and using a minimum cut algorithm disconnecting the candidate source nodes from the candidate sink nodes to partition one of the two clusters 144 into two new clusters 124b, 124c.

This process of partitioning contradictory clusters into new clusters may be repeated until there are no more contradictory pairs of clusters. In a sense, this process extends the divisive hierarchical clustering started by first solving the contradictions caused by the self-contradictory clusters.

1.3 Solving Cycles of Three or More Clusters

Figure 15A:
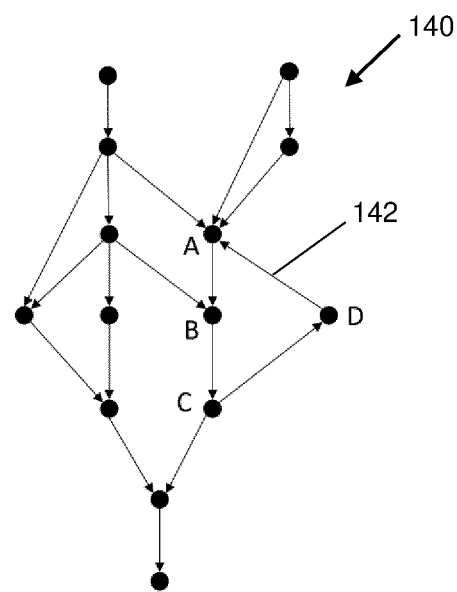
FIGS. 15a-15b show cycles and nested cycles in an oriented graph according to examples disclosed herein.

As mentioned above, an oriented graph (FIG. 15a) may be constructed to store the above/below relationships (vertical relative locations) between the clusters. In some examples this is done following solving the self-contradictory clusters and the contradictory pairs of clusters as discussed above. Cycle 142 in the oriented graph 140, as shown in FIG. 15a, may be identified in the oriented graph 140 using a depth first search algorithm as known from graph theory. A cycle 142 corresponds to a set of n clusters in which the first cluster is located vertically above the second cluster, and so on, until the (n−1)th cluster is located vertically above the nth cluster, and the nth cluster is located vertically above the first cluster. In FIG. 15a the cycle 142 contains the nodes A, B, C, D in the oriented graph 140. One or more of the clusters in a cycle may contain at least two parts of different horizons.

Figure 15B:
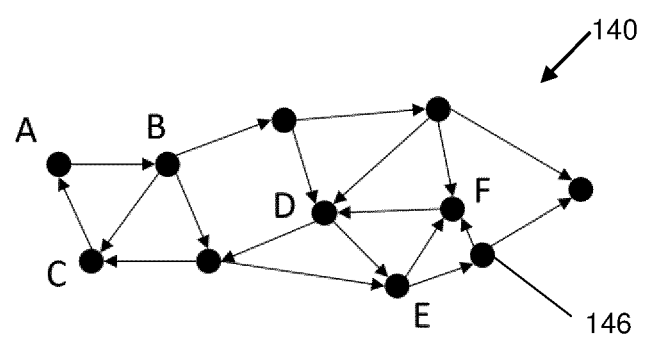

Cycles may be nested in the oriented graph, as shown in FIG. 15b. They may form a complex network. In order to make solving the cycles (to remove them) simpler, a network of cycles may be reduced to a few elementary cycles. To do so, each edge of the oriented graph 140 may be associated with a score. The score of an edge may be initialised to a predetermined value (e.g. to zero) and may be incremented by one for each cycle that contains it. Then, for each cycle, the edge with the maximum score may be kept. The shortest path from the end node to the start node of each one of these edges may be used to define the elementary cycle associated with the edge.

When the nodes of these elementary cycles are removed, there are no more cycles. In that sense, an elementary cycle may be considered to span the associated network of cycle (see FIG. 15b). The elementary cycles in FIG. 15b are shown by nodes A-B-C-A and D-E-F-D.

In other words, identifying an elementary cycle in the oriented graph may comprise identifying at least one set of nested cycles in the oriented graph, and reducing the at least one set of nested cycles to at least one elementary cycle by applying a score to each oriented edge joining nodes in the nested cycle, incrementing each oriented edge score by one for each cycle that contains that oriented edge, retaining the oriented edge having the highest score of all the oriented edges in the nested cluster, and identifying the shortest cycle containing this edge as the elementary cycle.

Figure 16A:
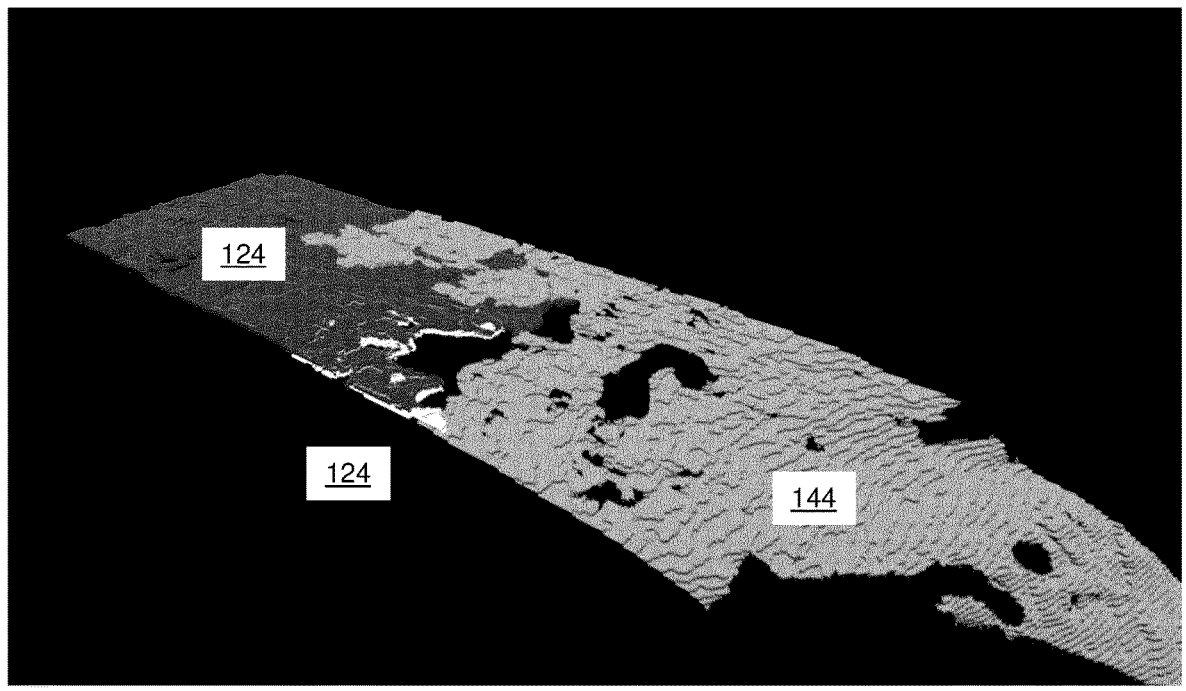
FIGS. 16a-b show a cycle of contradictory clusters according to examples disclosed herein and the retained cluster.
Figure 16B:
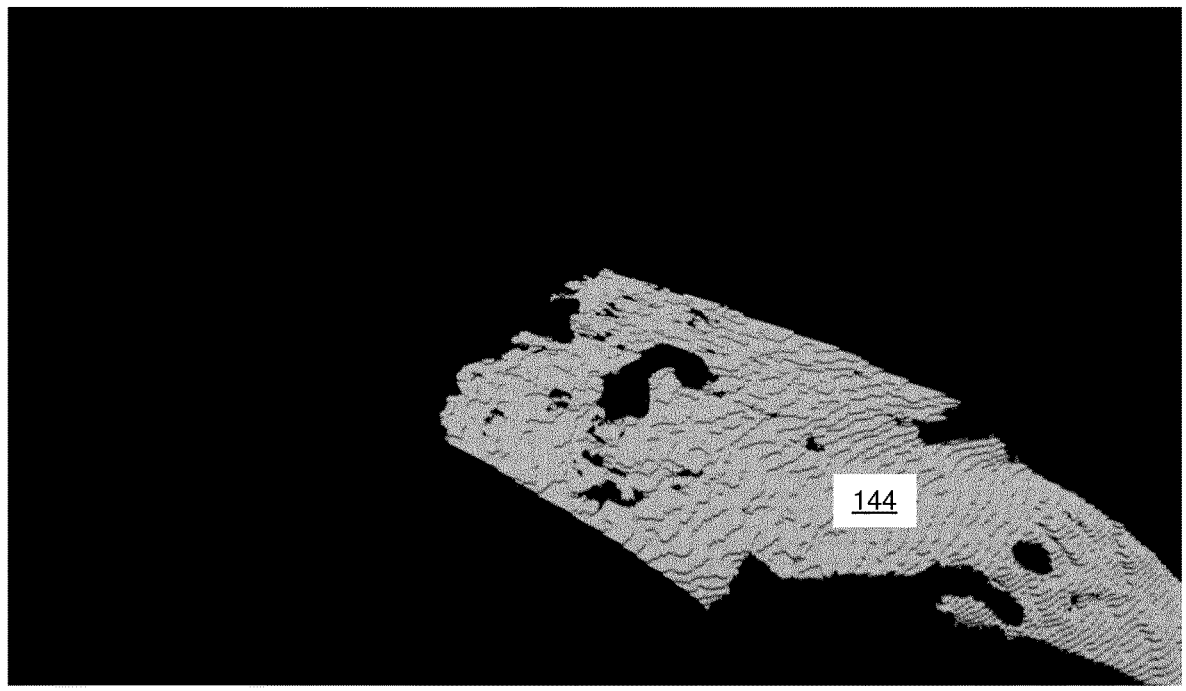

In some examples, to solve an elementary cycle, the largest cluster is kept, and the other clusters are removed. Among the voxels of this largest cluster, the ones that are not above or below the removed clusters are kept, the others are removed. This is shown in FIGS. 16a-b in which FIG. 16a shows a cycle of contradictory clusters, and FIG. 16b shows the removal of clusters to retain a part of the largest cluster. This process may be repeated until there are no more cycles in the oriented graph.

In other words, solving a contradictory set of n clusters may comprise: representing the neighbour graph as an oriented graph, wherein the contradictory set of n clusters is represented in the oriented graph as a cycle, the nodes in the cycle corresponding to the set of n clusters; and identifying at least one elementary cycle in the oriented graph and removing the nodes representing the smallest clusters contained by the elementary cycle and retaining the node representing the largest cluster contained by the elementary cycle. Then, obtaining the horizon data may comprise: in the retained cluster represented by the retained node in the elementary cycle, removing all voxels from the neighbour graph which are located vertically above and below voxels contained in clusters represented by the removed nodes in the elementary cycle; and removing the clusters corresponding to the removed oriented graph nodes from the remaining clusters and removing all the nodes representing removed voxels from the neighbour graph. A smallest cluster may be considered to comprise the smallest number of voxels compared with the other clusters in the set of n clusters. A largest cluster may be considered to comprise the largest number of voxels compared with the other clusters in the set of n clusters.

In some examples, for a plurality of sets of clusters, partitioning the neighbour graph into a plurality of sub-graphs may be performed by first solving contradictory sets of clusters containing one clusters, then solving contradictory sets of two clusters and then solving contradictory sets of n cluster, where n>2.

In some examples, the approach discussed above for self-contradictory clusters, contradictory sets of two clusters, and contradictory sets of three or more clusters, may not guarantee that each cluster corresponds to one horizon. However, in such cases it removes most of the connections between parts of different horizons. Once the different contradictory clusters are removed, the resulting oriented graph (vertical relative location graph) is acyclic and it is possible to compute a non-contradictory clusters volume as mentioned above. A non-contradictory clusters volume may represent a set of clusters whose subsets are all non-contradictory sets of clusters, and therefore the horizons represented by the clusters in the volume are geologically feasible.

2. Method(s) for Extracting Multiple Horizon Clusters from Adjacent Data Blocks

As described in the previous method(s), a neighbour graph is computed from a seismic data volume in order to extract the horizons clusters. The nodes of this graph may represent the peaks and/or troughs in the extrema voxels of the seismic data volume. However, the bigger the seismic data volume, the bigger will be the neighbour graph and the seismic data volume will eventually be too big, so that the neighbour graph will not fit into the RAM (Random Access Memory) of a currently available computer.

Figure 17A:
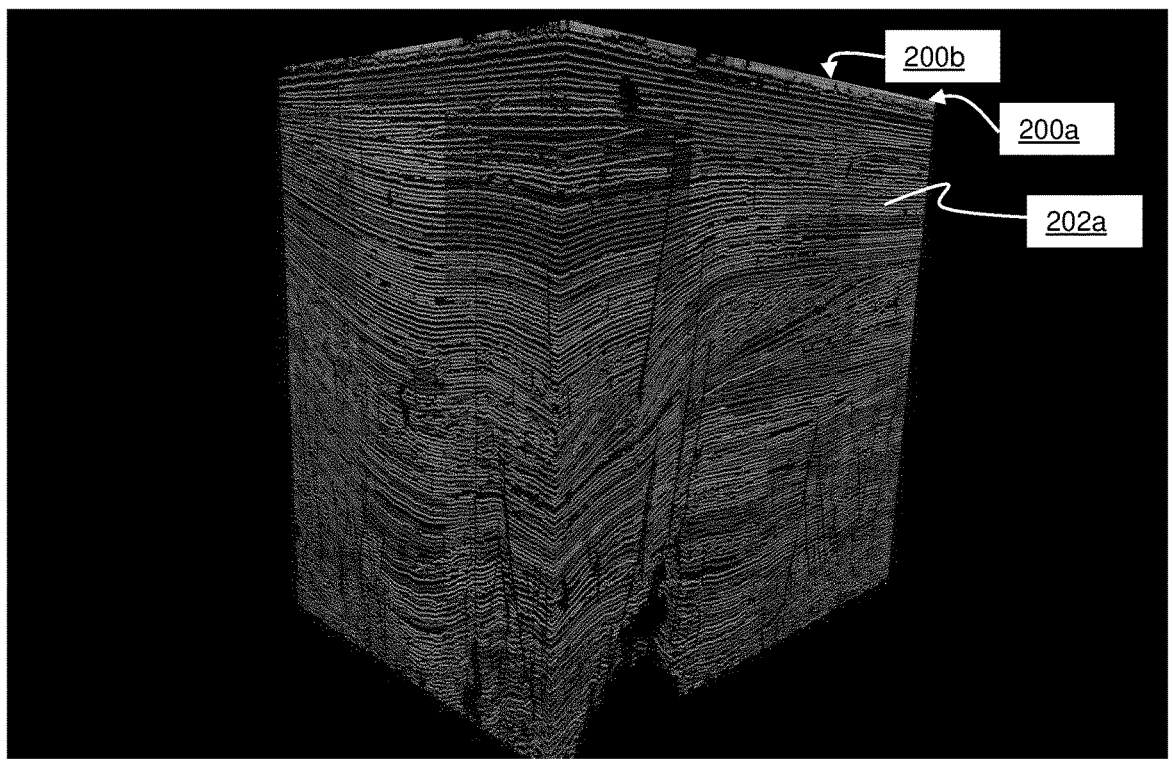
FIGS. 17a-b show (a) different clusters volumes, stacked together, obtained by extracting the clusters from the different data blocks, and (b) a so called "bin" volume obtained by merging the clusters of the adjacent blocks shown in (a) into bins and then "solving" the different contradictory sets of clusters.

In order to resolve this problem, the seismic data volume may be separated or divided up into smaller blocks of data, to then extract the horizon clusters from each of these blocks independently, before merging the adjacent clusters back together. FIG. 17a illustrates different clusters volumes 200a, 200b, etc. obtained by extracting the clusters, e.g. cluster 202a, from the different data blocks of the (divided) seismic data volume.

2.1 Adjacency Graph and Bins (i) Adjacency Graph

Two horizons clusters extracted from two different adjacent blocks may contain parts of the same horizon. In order to reach the goal of having one cluster only representing one horizon only, these two clusters are merged, providing they are adjacent.

At the interface between two blocks (the extrema voxels of the first block directly connected to extrema voxels of the second block and the extrema voxels of the second block directly connected to the extrema voxels of the first block), the peak voxels (i.e. extrema voxels assigned with value '1') of the first block and those of the second block are connected, if they are immediately adjacent (i.e. horizontally or diagonally). The other extrema voxels, i.e. trough voxels, positive to negative zero crossing voxels and negative to positive zero crossing voxels are connected the same way. Now, if two extrema voxels are connected, the first voxel is contained in a cluster of the first block and the second voxel is connected in a cluster of the second block, then these two clusters are adjacent. A pair of adjacent peak clusters (i.e. extrema voxels from the peak data) is represented by an edge (in accordance with common graph theory) connecting two nodes, the first node representing the first cluster and the second node representing the second cluster, in a non-oriented graph called 'adjacency peak graph'.

The 'adjacency trough graph', the 'adjacency positive to negative zero crossing graph' and the 'adjacency negative to positive zero crossing graph' are defined the same way. Some of these four extrema adjacency graphs may be concatenated into the adjacency graph. The nodes of the adjacency graph represent all the clusters extracted in all the blocks of data (for the whole seismic data volume). Some nodes may not be connected to any other nodes, if they represent clusters that are not adjacent to any other clusters.

The edges of the adjacency graph may be seen as a subgraph of the neighbour graph containing only the edges connecting nodes representing extrema voxels contained in two adjacent blocks. However, the weights may be computed in a different way. For example, the weight of an edge of the adjacency graph connecting two nodes representing two clusters adjacent along an interface, may be computed as follows:

Along each row of voxels in the direction perpendicular to the interface, amongst the voxels represented by the nodes of the neighbour graph contained in the first cluster, the node representing the furthest of these voxels from the interface may be set as source.

Along each row of voxels in the direction perpendicular to the interface, amongst the voxels represented by the nodes of the neighbour graph contained in the second cluster, the node representing the furthest of these voxels from the interface may be set as sink.

The weight may then be computed as the cost of the minimum cut disconnecting the source nodes from the sink nodes in the subset of the neighbour graph induced by the two clusters.

Figure 17B:
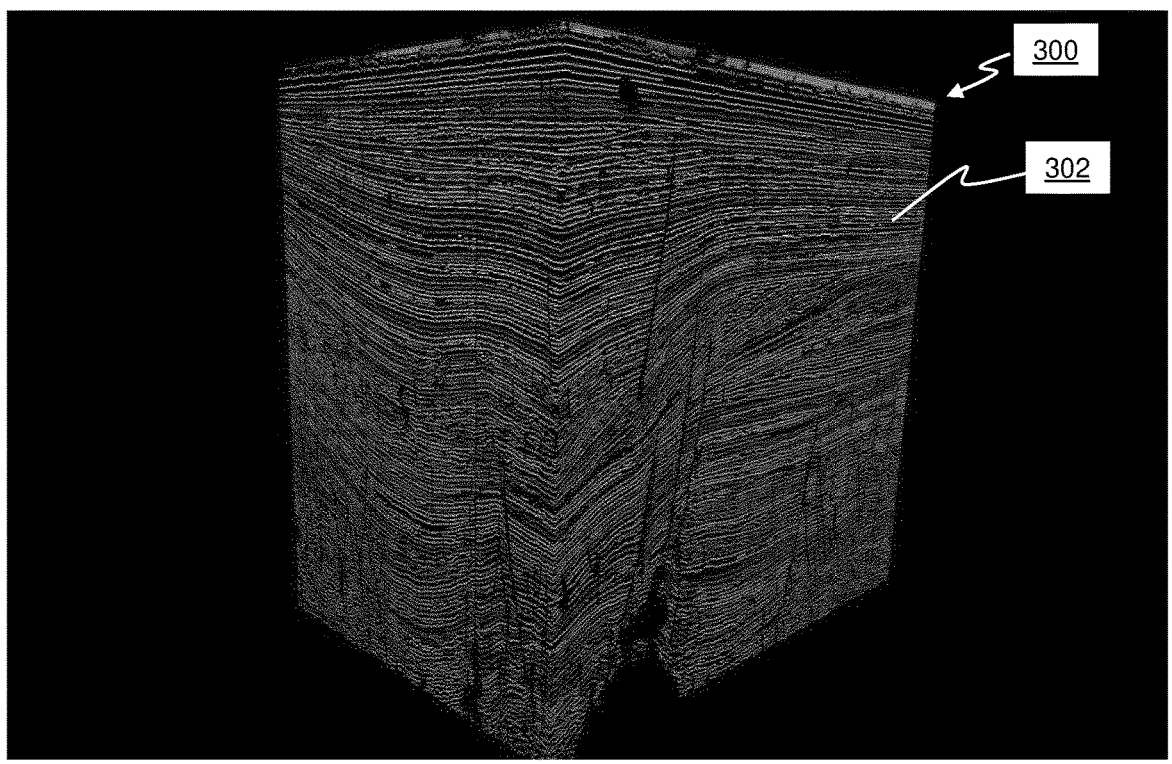

FIG. 17b illustrates such a volume 300 of the so called "bins" 302 obtained by merging the adjacent clusters, e.g. adjacent clusters 202a, 202b, etc of FIG. 17a.

(ii) Bins

Figure 18A:
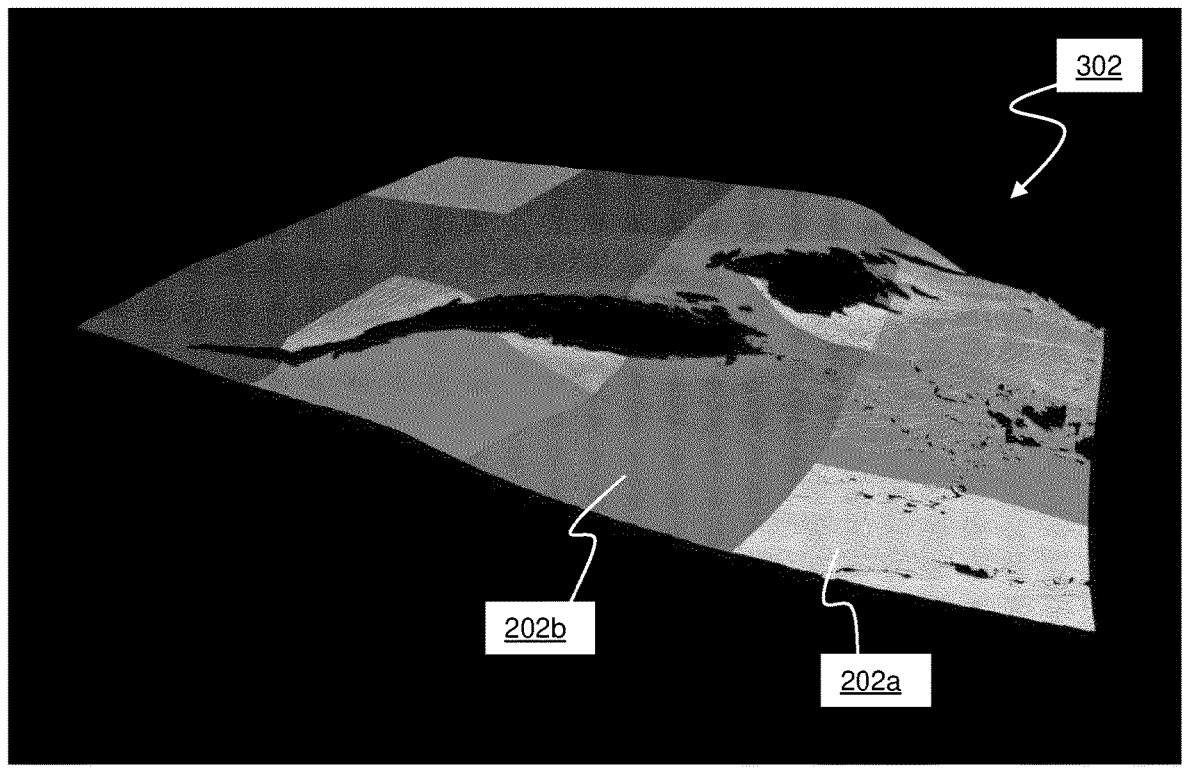
FIGS. 18a-b show (a) the adjacent clusters contained by a bin, which is not part of any contradictory bins (i.e. contradictory clusters of extrema voxels merged so as to define a horizon), and (b) the extrema voxels contained in the bin.
Figure 18B:
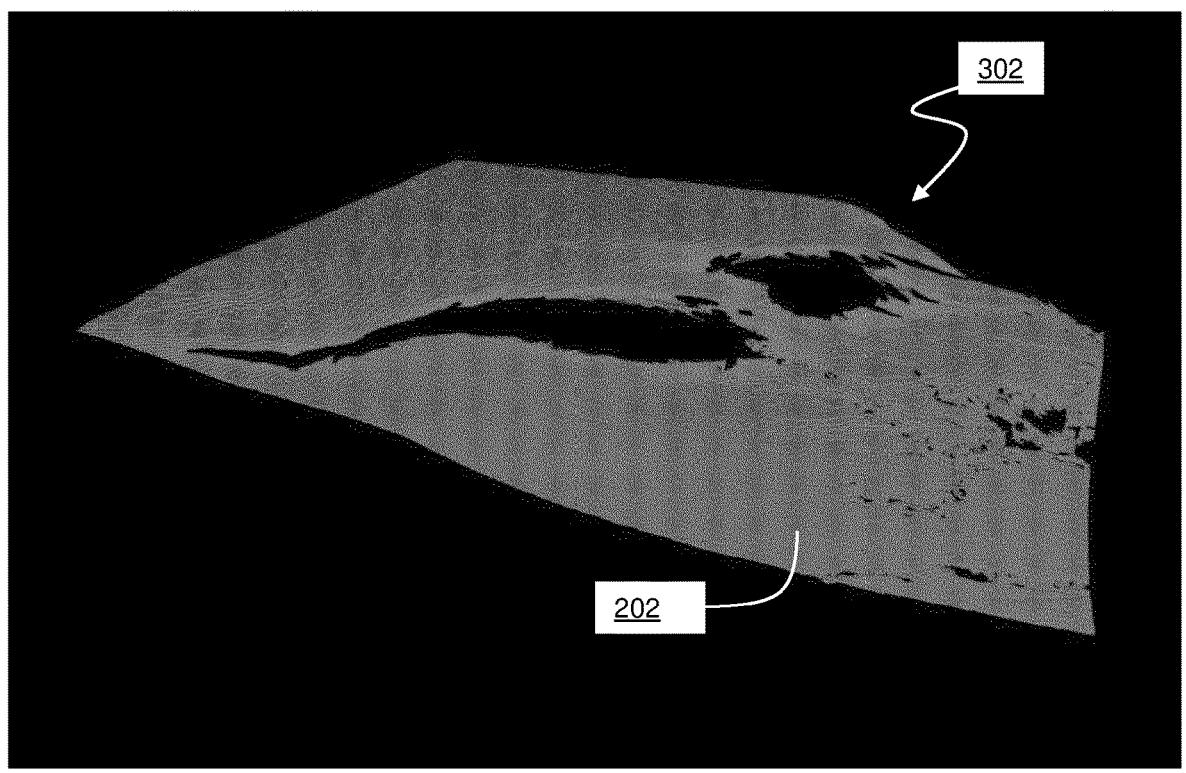

Referring now to FIGS. 18a and 18b, a connected component, e.g. bin 302, of this adjacency graph represents a group of adjacent clusters 202a, 202b, etc. It can also be seen as a cluster of nodes in the neighbour graph, i.e. the nodes of the neighbour graph contained in the clusters represented by the nodes contained by this connected component 302. As a result, such a connected component 302 is also a cluster of nodes in the neighbour graph or can be said to be a cluster of clusters. In order to avoid confusion between the clusters extracted from each block of data and the connected components of the adjacency graph, the connected components of the adjacency graph are called "bins".

(iii) Contradictory Sets of Bins

In the same way as with the single seismic data volume method described previously, the aim is to have one cluster, e.g. 202a, representing one single horizon in each block, e.g. 200a, and to have one bin, e.g. 302, representing one single horizon in the whole volume 300. Due to possible errors during the extraction of the horizon's clusters from each block, or due to the same issue as for the first stage happening at the interface between the blocks, a bin 302 may represent several horizons 202a, 202b, etc. Like the contradictory sets of one or more clusters (see, for example, FIG. 14), a contradictory set of one or more bins should be partitioned so as to solve this issue and provide one bin 302 representing one single horizon 202.

Finding the Contradictory Sets of Bins:

A self-contradictory bin may be a bin containing two nodes representing two voxels (i.e. extrema voxels) with the same horizontal coordinates but different vertical coordinates (i.e. above or below a respective extrema voxel).

For example, a contradictory set of two bins may be a set of two bins A and B, where bin A is above bin B, and bin B is above bin A. A contradictory set of n bins may be a set of n bins A1 . . . An, where bin A1 is above bin A2, . . . , bin An−1 is above bin An, and bin An is above bin A1. So, a first bin is above a second bin if the first bin contains at least one cluster above a cluster contained in the second bin.

Figure 19A:
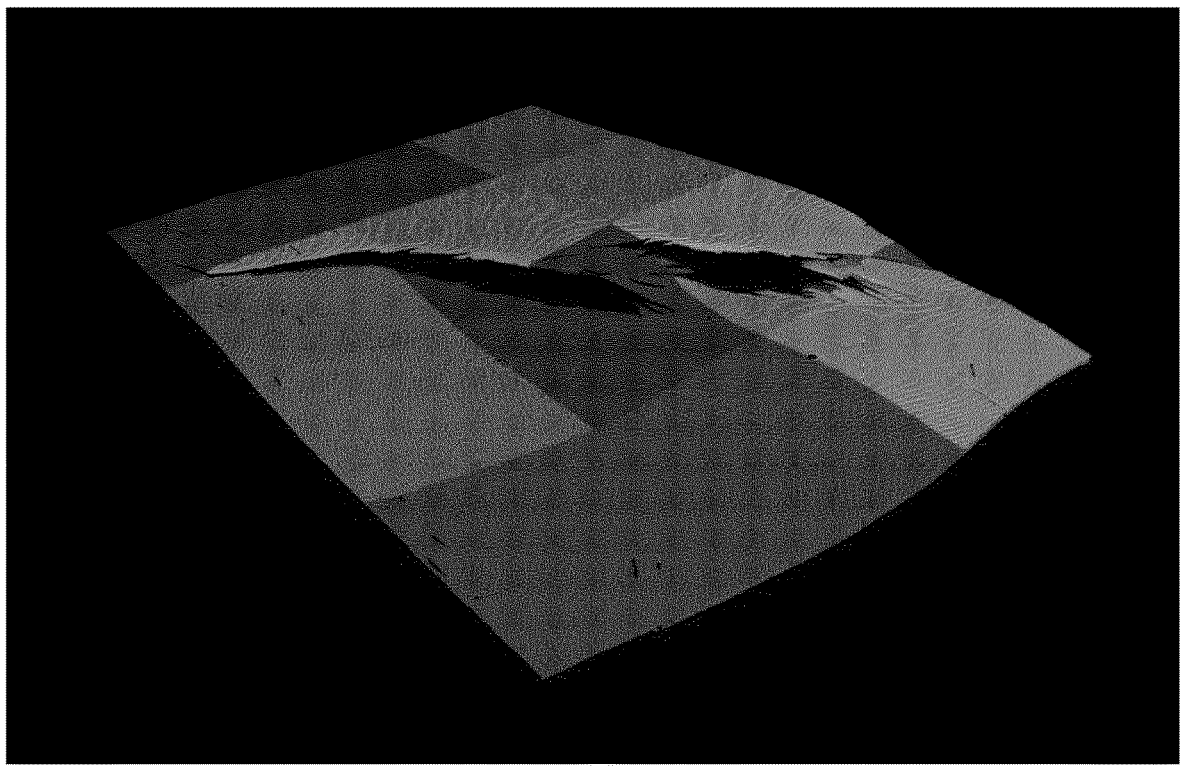
FIGS. 19a-b show (a) the clusters contained in a bin which is part of a contradictory set of clusters of one single bin, and (b) the clusters contained in the reduced bin obtained from the bin of (a)
Figure 19B:
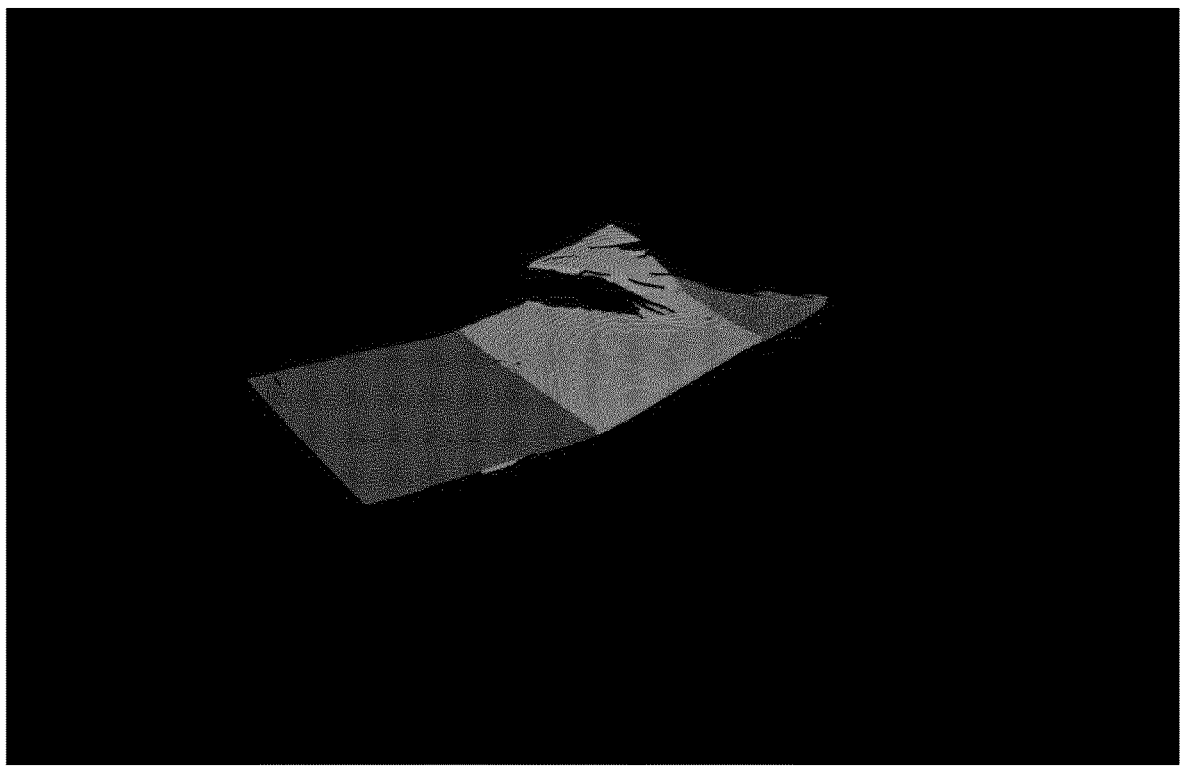
Figure 20A:
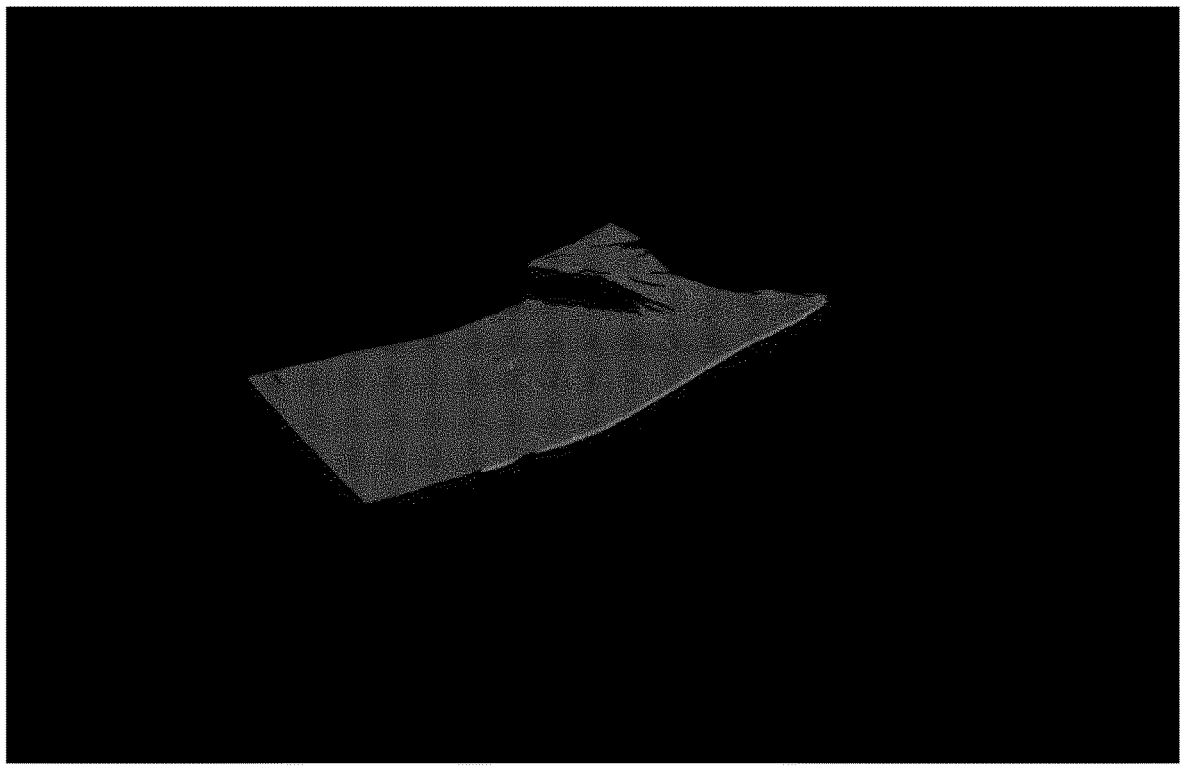
Figure 20B:
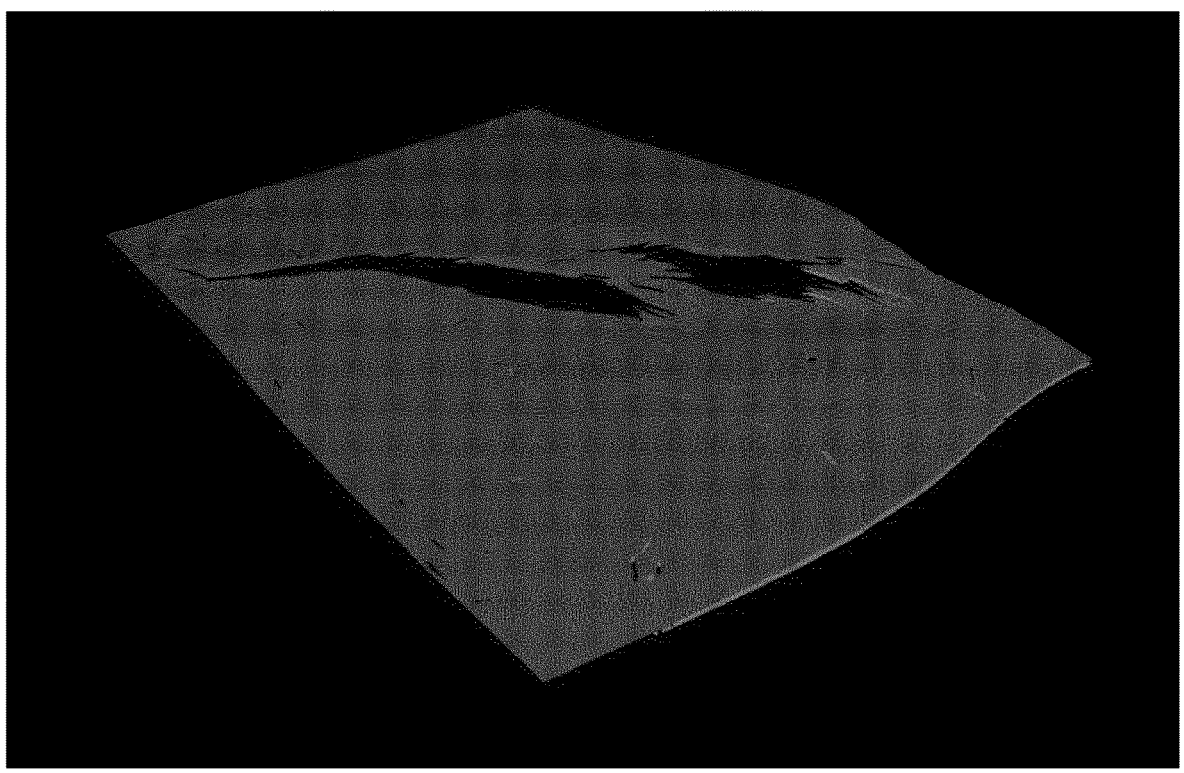

Solving the Contradictory Sets of Bins:

The contradictory sets of n bins may be solved by any one of:

solving the contradictory sets of one single bin;
then solving the contradictory sets of two bins;
then solving the contradictory sets of n clusters (n>2);

Solving the Contradictory Sets of One Single Bin:

Depending on the size of the bin, a contradictory set of one single 'small' bin (i.e. a bin size suitable for the RAM of the processing computer) may be solved using the same method as for the contradictory sets of one single cluster within each block, i.e. with no computer RAM issues. A contradictory set of one single 'bigger' bin (i.e. a bin size that is too large for the RAM of the processing computer) may be solved using a reduced bin method (see FIG. 19b), which is described in detail at a later stage (see point (iii)).

Solving the Contradictory Sets of Two Bins:

A non-self-contradictory bin contains, at most, as many nodes as the number of voxels in the two horizontal dimensions, which is generally expected to operably fit into the RAM of the processing computer. Therefore, the contradictory sets of clusters are solved using the same method as for the contradictory sets of two clusters within each block (see point 1.).

2.2 Solving the 'Bigger' Self-Contradictory Bins—Reduced Bin Method

Referring now to FIGS. 19a, 19b, 20a and 20b, a self-contradictory bin may be reduced into a subset of the clusters it contains, as small as possible, i.e. so that the subgraph of the neighbour graph induced by the reduced bin fits in the RAM of the processing computer. The clusters contained by the reduced bin should contain the nodes representing the voxels located at the interface between the two new bins obtained by partitioning the bin using the algorithm described to solve the contradictory sets of one single cluster (see under point 1.). It is not possible to find this interface with the current computer memories available. As a result, this interface may be approximated to then (inside the reduced bin) set some nodes as the source and the sink so as to obtain the final cut using the minimum cut algorithm, possibly incrementally.

(i) Temporary Clusters

The clusters represented by nodes contained by the self-contradictory bin and containing at least one node in at least two of the three categories 'source', 'sink', 'non-source' and 'non-sink' are partitioned into more clusters, called 'virtual clusters'.

In the neighbour graph, the nodes contained by a connected component of non-source and non-sink nodes represented by a set of connected voxels, completely surrounded by a set of connected voxels represented by source nodes contained by one single connected component of source nodes, are set as additional source nodes.

In the neighbour graph, the nodes contained by a connected component of non-source and non-sink nodes represented by a set of connected voxels, completely surrounded by a set of connected voxels represented by sink nodes contained by one single connected component of sink nodes, are set as additional sink nodes.

The nodes contained by a small connected component of non-source and non-sink nodes (containing fewer nodes than a predefined number, such as, for example, ten nodes) are set as additional source, if their non non-source and non-sink neighbours are all source nodes.

The nodes contained by a small connected component of non-source and non-sink nodes (containing fewer nodes than a predefined number, such as, for example, ten nodes) are set as additional sink, if their non non-source and non-sink neighbours are all sink nodes.

The connected components of the source nodes in the neighbour graph are set as 'virtual clusters' and the connected components of the sink nodes in the neighbour graph are set as 'virtual clusters'.

The connected components of non-source and non-sink nodes in the neighbour graph, which are not set as additional source or sink nodes, are set as 'virtual clusters'.

The clusters which remain unpartitioned after this stage and the 'virtual clusters' form a new partition of the nodes contained by the self-contradictory bin in the neighbour graph. Theses clusters may be called 'temporary clusters'.

(ii) Temporary Adjacency Graph

A temporary adjacency subgraph is computed, and its nodes represent the temporary clusters. Here, the edges may be computed by the following:

For each edge of the adjacency graph connecting two nodes representing unpartitioned clusters, there is an edge connecting the corresponding nodes in the temporary adjacency graph.

For each edge of the adjacency graph connecting a node representing an unpartitioned cluster and a node representing a partitioned cluster, as many edges as the number of 'virtual clusters' created from the partitioned cluster are candidate edges of the temporary adjacency graph, these candidate edges connecting the node representing the unpartitioned cluster and a node representing a 'virtual cluster' created from the partitioned cluster.

For each edge of the adjacency graph connecting two nodes representing two partitioned clusters, as many edges as the number of different possible combinations of a 'virtual cluster' created from the first partitioned clusters and a 'virtual clusters' created from the second partitioned cluster are candidate edges of the temporary adjacency graph, each one of these candidate edges connecting a node representing a 'virtual cluster' created from the first partitioned cluster and a node representing a 'virtual cluster' created from the second partitioned cluster.

Further, the weight of an edge of the temporary adjacency graph connecting two nodes representing two unpartitioned clusters is the same as the weight of the corresponding edge in the adjacency graph.

The weight of a candidate edge connecting a node representing a 'virtual cluster' with another node representing another 'temporary cluster' may be computed as follows:

The number of edges connecting voxels contained in the 'virtual cluster' and voxels contained in the other 'temporary cluster', if these two 'temporary clusters' are contained in the same data block.

Or, in the case the weights of the edges of the neighbour graph are chosen as described in the previous method(s) under point 1., the sum of the weights of the edges connecting voxels contained in the 'virtual cluster' and voxels contained in the other 'temporary cluster', if these two 'temporary clusters' are contained in the same data block.

Also, the candidate edges with non-zero weights are set as edges in the temporary graph.

(iii) Rough Minimum Cut (in the Adjacency Graph)

The minimum cut disconnecting the source nodes from the sink nodes in the temporary adjacency graph partitions the set of nodes contained in the temporary adjacency graph into two sets of nodes, the first containing the source nodes and the second containing the sink nodes.

(iv) Reduced Bin

All the nodes of the temporary adjacency graph connected by the edges contained by the minimum cut are part of the reduced bin. If there are any sets of three nodes of the temporary adjacency graph that comply with a set of conditions, then the node which is not in the reduced bin is set as an additional reduced bin node. The set of conditions are as follows:

Two of these nodes are contained by the reduced bin, the third is not.

The node which is not contained by the reduced bin represents a cluster extracted from the same block of data as the cluster represented by one of the two nodes contained by the reduced bin. The other node in the reduced bin represents a cluster extracted from a different block of data.

The node not contained by the reduced bin is a neighbour of the node in the reduced bin representing a cluster extracted from a different block, which is a neighbour of the other node in the reduced bin.

The two nodes representing clusters extracted from the same block contain neighbour voxels, i.e. at least one voxel representing a node of the first cluster and one voxel representing a node of the second cluster are neighbours.

Figure 21A:
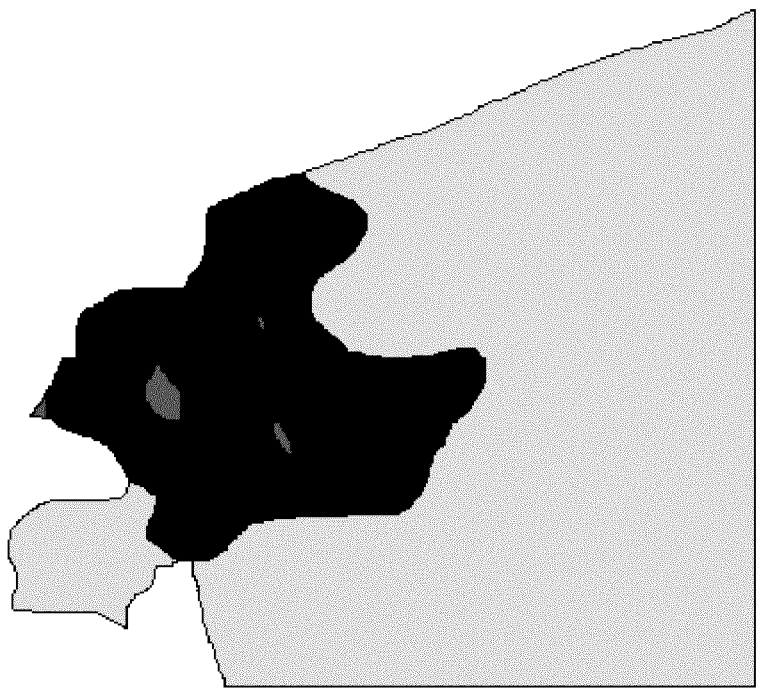
FIGS. 21a-c show (a) a vertical projection of a partitioned cluster, where the components of non-source and non-sink nodes (dark grey) which are completely surrounded by a connected component of source nodes, and the small connected components of non-source and non-sink nodes (dark grey) are merged with their source neighbour (black) to form a virtual source cluster, wherein the other connected components (light grey) are non-source and non-sink virtual clusters, and (b) an illustration of setting the additional source and sink nodes in the neighbour graph, and (c) the voxels represented by additional source and sink nodes in the neighbour graph, as a result of the reduced bin components and the non-reduced bin components illustrated in FIG. 21b.
Figure 21B:
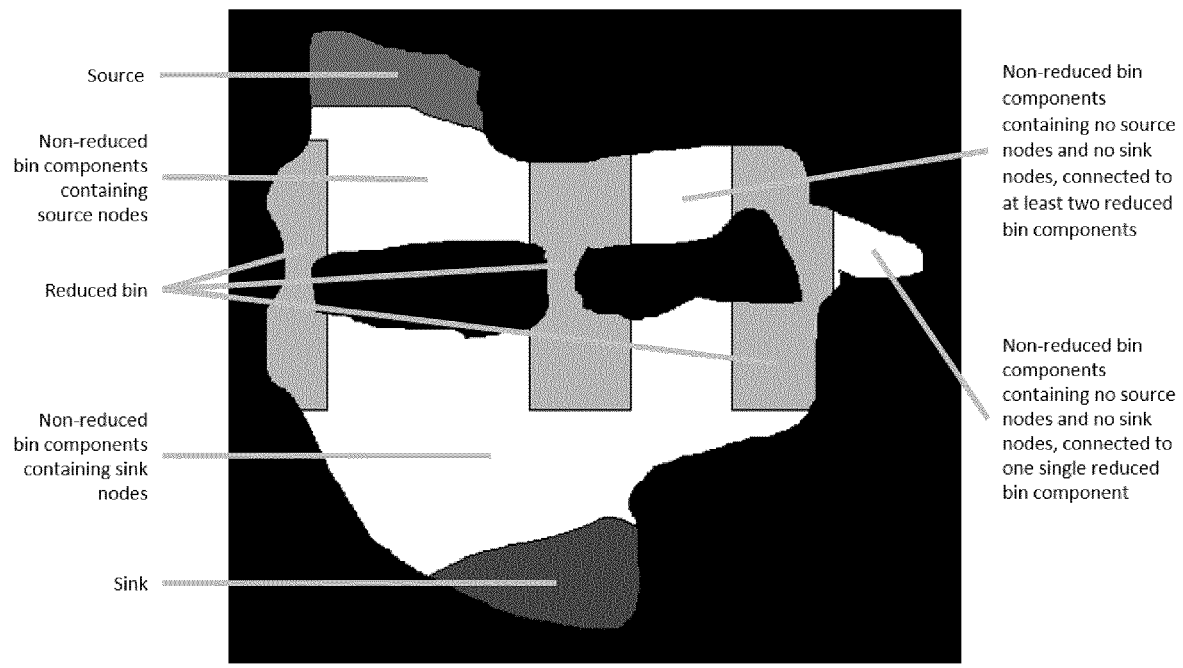
Figure 21C:
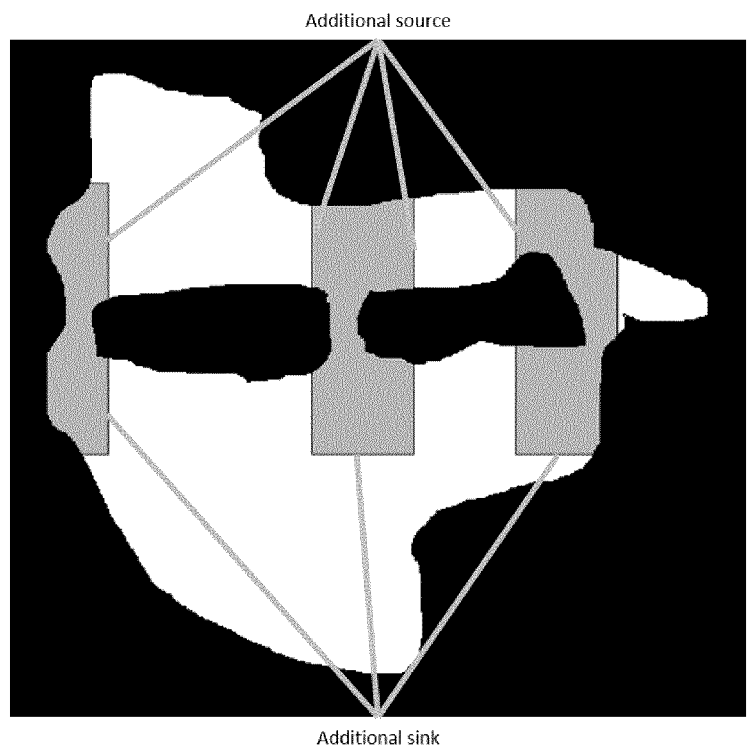

2.3 Partitioning the Reduced Bin (i) Setting the Source and Sink Nodes in the Neighbour Graph Referring now to FIGS. 21a, 21b and 21c, the nodes of the neighbour graph contained by the clusters represented by source nodes in the reduced bin are set as source nodes, and the nodes of the neighbour graph contained by the clusters represented by sink nodes in the reduced bin are set as sink nodes.

(ii) Non-Reduced Bin Components in the Adjacency Graph

As particularly shown in FIG. 21b, the connected components of the subgraph of the temporary adjacency graph induced by the set of nodes contained by the reduced bin are called 'reduced bin components'. The connected components of the subgraph of the temporary adjacency graph induced by the set of nodes not contained by the reduced bin are called 'non-reduced bin components'. The non-reduced bin components are either:

Non-reduced bin components containing source nodes.

Non-reduced bin components containing sink nodes.

Non-reduced bin components containing no source nodes and no sink nodes, connected to one single reduced bin component.

Non-reduced bin components containing no source nodes and no sink nodes, connected to at least two reduced bin components.

(iii) Setting the Additional Source and Sink Nodes in the Neighbour Graph

Each node of the temporary adjacency graph contained by a non-reduced bin component containing source nodes and which is a direct neighbour of at least one reduced bin node is set as 'interface source node'.

Each node of the temporary adjacency graph contained by a non-reduced bin component containing sink nodes and which is a direct neighbour of at least one reduced bin node is set as 'interface sink node'.

Each node contained by both, the first set of nodes (as defined under 'Rough minimum cut') and a non-reduced bin component containing no source nodes and no sink nodes, connected to at least two reduced bin components, and which is direct neighbour of at least one reduced bin node is set as 'interface source node'.

Each node contained by both, the second set of nodes (as defined under 'Rough minimum cut') and a non-reduced bin component containing no source nodes and no sink nodes, connected to at least two reduced bin components, and which is a direct neighbour of at least one reduced bin node is set as interface source node'.

All the nodes of the neighbour graph contained by a cluster represented by an interface source node in the temporary adjacency graph and direct neighbours of nodes of the neighbour graph contained by a cluster represented by a non-source and non-sink reduced bin node are set as additional source nodes.

All the nodes of the neighbour graph contained by a cluster represented by an interface sink node in the temporary adjacency graph and direct neighbours of nodes of the neighbour graph contained by a cluster represented by a non-source and non-sink reduced bin node are set as additional sink nodes.

(iv) Refined Minimum Cut (in the Neighbour Graph)

All the nodes of the neighbour graph contained by clusters represented by nodes contained by the reduced bin plus the additional source nodes and the additional sink nodes induce a subgraph of the neighbour graph. The minimum cut disconnecting the source nodes from the sink nodes in this subgraph defines a partition of its nodes into two sets of nodes.

(v) Possible Extension of the Reduced Bin

In case a cluster represented by a node contained by a non-reduced bin component containing no source nodes and no sink nodes, connected to one single reduced bin component, contains both nodes which are direct neighbours of nodes contained by the first set (as defined) and nodes which are direct neighbours of nodes contained by the second set (as defined in 2.2(iv)), then such a cluster would be represented by a node connected to both sets. This situation would lead to the bin staying unpartitioned. In case this happens, the non-reduced bin nodes representing such clusters are added to the list of additional reduced bin clusters and the previous stages (see 2.3(i)-(iv)) are repeated until no non-reduced bin clusters remain connected to both partitions.

2.4 Updating the Clusters, the Adjacency Graph and the Bins (i) New Clusters

Each cluster represented by a node contained by the reduced bin, containing at least one node in the first set (as defined in 2.3(iv)) and at least one node in the second set (as defined in 2.3(iv)) needs to be partitioned into two new clusters. Removing the edges contained in the minimum cut (as defined in 2.3(iv)) from the subgraph of the neighbour graph induced by such a cluster would disconnect the subgraph into at least two connected components, each one induced by a new cluster of nodes of the neighbour graph.

(ii) Updating the Adjacency Graph

Each edge of the adjacency graph connecting a node representing a reduced bin cluster and a node representing another cluster (reduced bin or not) may be removed. Also, the nodes of the adjacency graph representing the partitioned clusters (as defined in 2.4(i)) may be removed. For each new cluster, created from partitioning the partitioned clusters, a new node representing the new cluster is added to the adjacency graph.

Further, each edge of the subgraph of the neighbour graph, induced by the nodes contained by the reduced bin and the additional source and sink nodes, which is not part of the minimum cut, is connecting a node contained by a cluster and a node contained by another cluster (new clusters created from partitioned clusters or unpartitioned clusters as defined in 2.4(i)). Also, if a node of the neighbour graph contained by a new cluster or an unpartitioned cluster is a direct neighbour of a node of the neighbour graph contained by a new cluster or an unpartitioned cluster, then a new edge connecting the two nodes representing these two clusters in the adjacency graph is created. The weight of the new edge may be computed as follows:

The weight may be the number of edges of the neighbour graph connecting nodes contained by the cluster represented by the first node of the new edge and nodes contained by the cluster represented by the second node of the new edge, if the voxels represented by the nodes contained by these two clusters are contained in the same data block.

retaining one of the two partitions of the first and the second clusters which minimises the cost of the cut used to obtain the partition.

(iii) New Bins

The connected components of the subgraph of the updated adjacency graph induced by the bin are new bins which may be self-contradictory or not.

3. Apparatus for Performing any One of the Method(s) Under Point 1. And 2.

Figure 22:
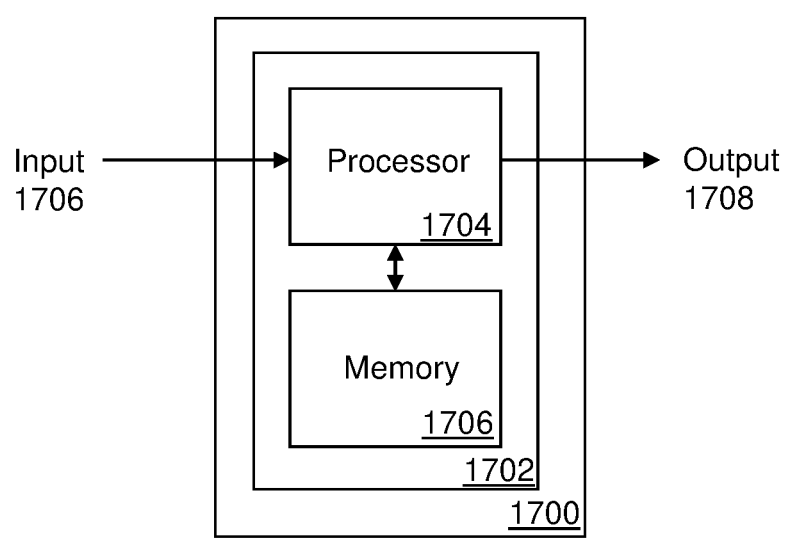
FIG. 22 illustrates a computing device according to examples disclosed herein.

FIG. 22 illustrates an example computing device 1700 comprising an example apparatus 1702. Any of the methods disclosed may be carried out by an apparatus 1702 comprising a processor 1704 and memory 1706, wherein the processor 1704 is configured to perform any method disclosed herein. The processor may receive, as input 1706, data such has seismic data. The processor may provide, as output 1708, data such as horizon data, including non-contradictory horizon data. According to a further embodiment of the invention there is provided a computing device 1700 comprising at least one apparatus 1702 as disclosed herein configured to perform any method disclosed herein. Example computing devices include personal computers, laptop computers, handheld computing devices such as tablets and smartphones, a computing cluster of two or more devices, servers, and cloud computers in which one or more storage and/or processing functions are performed using a remote cloud storage and/or processing facility.

Also disclosed herein is a computer-readable storage medium (e.g. memory 1706, or it may be a memory external to the computing device 1700) having embodied thereon a computer program, when executed by a computer processor, is configured to perform any method or combinations of methods disclosed herein.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The claimed invention is not restricted to the details of any foregoing embodiments or examples. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments or examples, but also any embodiments which fall within the scope of the claims.

It will be appreciated by persons skilled in the art that the above embodiments have been described by way of example only and not in any limitative sense, and that various alterations and modifications are possible without departing from the scope of the invention as defined by the appended claims.

The invention claimed is:

1. A computer-implemented method for extracting clusters of voxels representing parts of geological horizons from a seismic data volume by iteratively partitioning extrema voxels included in the clusters of voxels until a resulting set of clusters of voxels is not self-contradictory and until no contradictory sets of clusters remain, the method comprising:
    obtaining a seismic data volume, which includes a plurality of voxels, at least some of which have values of either one or zero;
    generating extrema mask volumes from the seismic data volume by comparing a value of each voxel of the seismic data volume with values of voxels located above and below said each voxel and by assigning a predetermined extrema value to each one of a found extrema voxel and a zero value to all other voxels in the seismic data volume;
    modifying the extrema mask volumes by setting zero values at detected fault locations within the extrema mask volumes, wherein setting the zero values at the fault locations in the extrema mask volumes results in disconnecting different parts of horizons into several connected components and further results in disconnecting different incorrectly connected parts of horizons from each other;
    determining extrema graphs from the extrema mask volumes by representing each pair of neighboring extrema voxels in the extrema mask volumes, which neighboring extrema voxels are immediately horizontally or immediately diagonally adjacent, by two connected nodes in each extrema graph;
    determining a neighbor graph from the extrema graphs, wherein neighboring extrema voxels in all of the extrema mask volumes are represented as connected nodes in the extrema graphs;
    partitioning the nodes of the neighbor graph into a set of clusters, wherein a cluster contains a plurality of connected nodes representing extrema voxels of the extrema mask volumes and each node is part of one cluster only, wherein each cluster in the set of clusters is designed to represent a part of a single geological horizon;
    for each subset of the set of clusters, identifying whether or not the subset is a contradictory set of clusters according to at least one first predetermined condition;
    hierarchically partitioning any of the contradictory sets of clusters into a plurality of subgraphs, wherein each subgraph is provided by a separate non-contradictory cluster that is not part of a contradictory set of clusters; and
    obtaining horizon data representing a plurality of horizons from the non-contradictory clusters inducing the plurality of subgraphs of the neighbor graph.

2. The method according to claim 1, wherein the at least one first predetermined condition defines contradictory sets of clusters according to any one or all of:
    (i) a set of a single cluster, which contains extrema voxels located both vertically above and below one horizontal location;
    (ii) a set of two clusters, wherein a first cluster of the set of two clusters is located both above and below a second cluster; or (iii) a set of n clusters, wherein a first cluster of the set of n clusters is located vertically above a second cluster of the set of n clusters; the (n-1)th cluster is located vertically above an nth cluster of the set of n clusters; and the nth cluster is located vertically above the first cluster of the set of n clusters.

3. The method according to claim 1, wherein the extrema graph comprises one or more of:
    a peak binary volume, which is generated by identifying peak voxels having higher values than the values of the further voxels vertically adjacent to the peak voxels, wherein the peak voxels are assigned a value of '1' and remaining voxels are assigned a value of '0';
    a trough binary volume, which is generated by identifying trough voxels having lower values than the values of the further voxels vertically adjacent to the trough voxels, wherein the trough voxels are assigned a value of '1' and remaining voxels are assigned a value of '0';
    a positive to negative zero-crossing binary volume, which is generated by identifying voxels with positive values immediately above voxels with negative values and, for each set of two voxels in which a voxel with a positive value is immediately above a voxel with a negative value, retaining the voxel with the value closer to zero, wherein the positive to negative zero-crossing voxels are assigned a value of '1' and remaining voxels are assigned a value of '0';
    a negative to positive zero-crossing binary volume, which is generated by identifying voxels with negative values immediately above voxels with positive values and, for each set of two voxels in which a voxel with a negative value is immediately above a voxel with a positive value, retaining the voxel with the value closer to zero, wherein the negative to positive zero-crossing voxels are assigned a value of '1' and remaining voxels are assigned a value of '0'; and wherein the extrema graph is obtained using the extrema voxels having a value of 1 from at least one of the peak binary volume, the trough binary volume, the positive to negative zero-crossing binary volume and the negative to positive zero-crossing binary volume.

4. The method according to claim 3, wherein determining the neighbor graph comprises concatenating at least two of: the peak binary volume, the trough binary volume, the positive to negative zero-crossing binary volume and the negative to positive zero-crossing binary volume.

5. The method according to claim 1, comprising obtaining a clusters volume by assigning each cluster with a unique index, and setting the value of the voxels represented by the nodes contained by the cluster to the unique index in the clusters volume.

6. The method according to claim 1, further comprising representing the clusters in an oriented graph by:
representing each cluster of nodes in the neighbor graph by a node in the oriented graph; and
representing a first cluster located immediately above a second cluster by an oriented edge in the oriented graph, the oriented edge connecting a first node representing the first cluster and a second node representing the second cluster;
wherein the oriented graph indicates the relative vertical positions of the clusters in the seismic data volume, and also indicates the presence of a contradictory set of clusters as being represented by nodes of a cycle in the oriented graph.

7. The method according to claim 1, wherein identifying whether or not a set of clusters is contradictory comprises determining that a cluster is below a further cluster by:
starting at an extrema voxel represented by a node of the cluster in the neighbor graph;
scanning vertically downwards from the starting node;
stopping at each encountered extrema voxel represented by a node of a first cluster in a cluster volume representing a set of clusters, the further cluster being immediately below the first cluster.

8. The method according to claim 1, wherein, if the set of clusters contains exactly two clusters, solving the contradictory set of clusters comprises:
defining one or more candidate source nodes representing extrema voxels contained by a first cluster of the two clusters and located above other extrema voxels represented by nodes contained by a second cluster of the two clusters;
defining one or more candidate sink nodes representing extrema voxels contained by the first cluster and located below other extrema voxels represented by nodes contained by the second cluster;
retaining the candidate source nodes, as source nodes, which form the largest connected component of the subgraph of the neighbor graph induced by the candidate source nodes;
retaining the candidate sink nodes, as sink nodes, which form the largest connected component of the subgraph of the neighbor graph induced by the candidate sink nodes;
using a minimum cut algorithm disconnecting the source nodes from the sink nodes to partition the subgraph of the neighbor graph induced by the first cluster into two new subgraphs and partitioning the first cluster into two new clusters inducing the two new subgraphs;

defining one or more candidate source nodes representing extrema voxels contained by the second cluster and located above other extrema voxels represented by nodes contained by the first cluster;
defining one or more candidate sink nodes representing extrema voxels contained by the second cluster and located below other extrema voxels represented by nodes contained by the first cluster;
retaining the candidate source nodes, as source nodes, which form the largest connected component of the subgraph of the neighbor graph induced by the candidate source nodes;
retaining the candidate sink nodes, as sink nodes, which form the largest connected component of the subgraph of the neighbor graph induced by the candidate sink nodes;
using a minimum cut algorithm disconnecting the source nodes from the sink nodes to partition the subgraph of the neighbor graph induced by the second cluster into two new subgraphs and partitioning the second cluster into two new clusters inducing the two new subgraphs; and
retaining one of the two partitions of the first and the second clusters which minimizes the cost of the cut used to obtain the partition.

9. The method according to claim 1, comprising:
representing the neighbor graph as an oriented graph by duplicating each non-oriented edge of the neighbor graph to form two oriented edges having opposite orientations.

10. The method according to claim 9, wherein, if the set of clusters contains n clusters, wherein n>2, solving the contradictory set of clusters comprises:
representing the neighbor graph as an oriented graph wherein the contradictory set of n clusters is represented in the oriented graph as a cycle, the nodes in the cycle representing the set of n clusters, and
identifying at least one elementary cycle in the oriented graph and removing the nodes representing the smallest clusters contained by the elementary cycle and retaining the node representing the largest cluster contained by the elementary cycle.

11. The method according to claim 10, wherein obtaining the horizon data comprises:
in the retained cluster represented by the retained oriented graph node, removing all nodes from the neighbor graph which represent extrema voxels located vertically above and below extrema voxels represented by nodes contained in clusters represented by the nodes removed from the oriented graph; and
removing the clusters represented by the removed oriented graph nodes from the set of clusters and removing all the nodes in these clusters from the neighbor graph.

12. The method according to claim 10, wherein:
identifying the elementary cycle in the oriented graph comprises identifying at least one set of nested cycles in the oriented graph; the method further comprising reducing the at least one set of nested cycles to at least one elementary cycle by:
setting a score initialized to the same predetermined value for each oriented edge joining nodes in the nested cycles;
incrementing each oriented edge score by one for each cycle that contains that oriented edge;

retaining the oriented edge having the highest score of all the oriented edges in each cycle of the set of nested cycles; and identifying the shortest cycle containing this edge as the elementary cycle.

13. The method of claim 10, wherein a contradictory set of two clusters is identified from a cycle containing exactly two nodes in the oriented graph.

14. The method of claim 1, wherein the seismic data volume is processed to reduce noise in the seismic data volume prior to the determining of the extrema binary volumes from the processed seismic data volume.

15. The method according to claim 1, wherein the neighbor graph is processed to remove one or more clusters containing fewer than a predetermined number of nodes prior to, for each remaining cluster, identifying whether or not the cluster is part of a contradictory set of clusters.

16. The method according to claim 1, comprising:

computing a fault binary volume by vowelizing a plurality of fault surfaces identified in the seismic volume and setting voxels corresponding to faults to a value of one;

computing a salt binary volume by setting voxels identified as salt to a value of one, and computing a chaos binary volume by setting voxels identified as being in a chaotic area to a value of one;

setting the value of voxels in the extrema binary volumes to zero where the value of the corresponding voxel is equal to one in the binary fault volume, the salt binary volume or the chaos binary volume.

17. The method according to claim 1, wherein edges of the neighbor graph connecting a node with two nodes representing extrema voxels having the same horizontal coordinates are removed from the neighbor graph prior to identifying whether or not there are any contradictory sets of clusters.

18. The method according to claim 1, wherein, if the seismic data volume exceeds a predetermined size threshold, the seismic data volume is first divided into adjacent blocks of seismic data before commencing the steps of determining the extrema mask volumes, determining an extrema graph from each extrema binary volume, determining a neighbor graph from the extrema graph and partitioning the nodes of the neighbor graph into a set of clusters extracted from the adjacent blocks of seismic data.

19. An apparatus comprising a processor and memory, wherein the processor is configured to perform a method according to claim 1.

20. A computer-readable storage medium having embodied thereon a computer program, when executed by a computer processor that is configured to perform the method of claim 1.

* * * * *